US009479838B2

(12) United States Patent
Makhlouf

(10) Patent No.: US 9,479,838 B2
(45) Date of Patent: Oct. 25, 2016

(54) SYSTEM AND METHOD FOR DISTRIBUTING MEDIA CONTENT FROM MULTIPLE SOURCES

(76) Inventor: Sam Makhlouf, Atlanta, GA (US)

(*) Notice: Subject to any disclaimer, the term of this patent is extended or adjusted under 35 U.S.C. 154(b) by 1208 days.

(21) Appl. No.: 12/592,369

(22) Filed: Nov. 24, 2009

(65) Prior Publication Data

US 2011/0126226 A1  May 26, 2011

(51) Int. Cl.

| G06F 3/00 | (2006.01) |
|---|---|
| G06F 13/00 | (2006.01) |
| H04N 5/445 | (2011.01) |
| H04N 21/482 | (2011.01) |
| H04N 7/173 | (2011.01) |
| H04N 21/2665 | (2011.01) |
| H04N 21/81 | (2011.01) |
| H04L 29/06 | (2006.01) |

(52) U.S. Cl.
CPC ...... *H04N 21/4821* (2013.01); *H04N 7/17336* (2013.01); *H04N 21/2665* (2013.01); *H04N 21/812* (2013.01); *H04L 65/4069* (2013.01)

(58) Field of Classification Search
CPC .......... H04N 21/47202; H04N 7/17318; H04N 7/17336; H04N 21/2543; H04N 21/84; H04N 21/6587; H04N 21/6125; H04N 21/812; H04N 21/23106; H04N 5/4401; H04N 5/44543; H04N 21/435
USPC .......... 725/25, 28, 29, 37, 38, 48, 59, 131, 725/139, 151, 32, 115, 116, 145, 146; 709/217–219
See application file for complete search history.

(56) References Cited

U.S. PATENT DOCUMENTS

| 6,008,803 | A | 12/1999 | Rowe et al. | |
|---|---|---|---|---|
| 6,177,931 | B1* | 1/2001 | Alexander et al. | 725/52 |
| 6,230,324 | B1 | 5/2001 | Tomita et al. | |
| 6,718,551 | B1 | 4/2004 | Swix et al. | |
| 7,293,066 | B1* | 11/2007 | Day | 709/213 |
| 7,444,659 | B2 | 10/2008 | Lemmons | |
| 7,493,636 | B2 | 2/2009 | Kitsukawa et al. | |
| 7,496,945 | B2 | 2/2009 | Rodriguez | |
| 7,739,710 | B2 | 6/2010 | Kwon et al. | |
| 7,839,385 | B2 | 11/2010 | Hunleth et al. | |
| 7,900,228 | B2 | 3/2011 | Stark et al. | |
| 7,992,179 | B1 | 8/2011 | Kapner, III et al. | |
| 8,079,054 | B1 | 12/2011 | Dhawan et al. | |
| 8,607,269 | B2 | 12/2013 | Needham et al. | |
| 8,656,431 | B2 | 2/2014 | Cavicchia | |
| 8,661,466 | B2 | 2/2014 | Stephens | |
| 8,799,977 | B1* | 8/2014 | Kapner et al. | 725/116 |
| 9,049,471 | B2 | 6/2015 | Krapf et al. | |
| 9,326,043 | B2 | 4/2016 | Makhlouf | |

(Continued)

OTHER PUBLICATIONS

Makhlouf, Samir B.; Final Office Action for U.S. Appl. No. 14/207,091, filed Mar. 12, 2014, mailed Oct. 27, 2015, 12 pgs.

(Continued)

*Primary Examiner* — Ngoc Vu
(74) *Attorney, Agent, or Firm* — Taylor English Duma LLP

(57) ABSTRACT

A subscriber unit is provided and configured to receive an input media content feed of a media content program selection from a first source upon a determination that predetermined conditions exist. The subscriber unit may further be configured to receive an input media content feed of a media content program selection from a second source upon determining that certain predetermined conditions do not exist.

19 Claims, 37 Drawing Sheets

(56) References Cited

U.S. PATENT DOCUMENTS

| | | | |
|---|---|---|---|
| 9,392,342 | B2 | 7/2016 | Makhlouf |
| 2001/0034883 | A1 | 10/2001 | Zigmond |
| 2003/0131357 | A1 | 7/2003 | Kim |
| 2004/0103439 | A1 | 5/2004 | Macrae et al. |
| 2004/0154040 | A1 | 8/2004 | Ellis |
| 2004/0221303 | A1 | 11/2004 | Sie et al. |
| 2005/0028206 | A1 | 2/2005 | Cameron et al. |
| 2005/0086692 | A1 | 4/2005 | Dudkiewicz et al. |
| 2005/0251820 | A1 | 11/2005 | Stefanik et al. |
| 2005/0278794 | A1* | 12/2005 | Leinonen et al. ............ 726/32 |
| 2007/0124777 | A1* | 5/2007 | Bennett et al. ............... 725/78 |
| 2008/0196075 | A1 | 8/2008 | Candelore |
| 2008/0244657 | A1 | 10/2008 | Arsenault et al. |
| 2008/0281699 | A1* | 11/2008 | Whitehead .................... 705/14 |
| 2009/0007178 | A1 | 1/2009 | Artom |
| 2009/0141174 | A1* | 6/2009 | Hardacker et al. .......... 348/569 |
| 2009/0241145 | A1* | 9/2009 | Sharma ......................... 725/43 |
| 2009/0327346 | A1 | 12/2009 | Teinila |
| 2010/0175090 | A1 | 7/2010 | Cordray |
| 2010/0199312 | A1* | 8/2010 | Chang et al. .................. 725/46 |
| 2010/0269140 | A1 | 10/2010 | Shin et al. |
| 2011/0107372 | A1* | 5/2011 | Walter ........................... 725/39 |
| 2011/0126226 | A1 | 5/2011 | Makhlouf |
| 2011/0126234 | A1 | 5/2011 | Makhlouf |
| 2011/0126249 | A1 | 5/2011 | Makhlouf |
| 2011/0292283 | A1 | 12/2011 | Stephens |
| 2012/0291104 | A1* | 11/2012 | Hasek .............................. 726/4 |
| 2013/0046641 | A1 | 2/2013 | Devree |
| 2014/0259045 | A1 | 9/2014 | Sangal |

OTHER PUBLICATIONS

Makhlouf, Samir B.; Non-Final Office Action for U.S. Appl. No. 14/207,091, filed Mar. 12, 2014, mailed May 6, 2015, 19 pgs.

Makhlouf, Samir B.; U.S. Patent Application entitled: System and Method for Reinforcing Brand Awareness With Minimal Intrusion on the View Experience, U.S. Appl. No. 14/207,091, filed Mar. 12, 2014; 19 pgs.

Makhlouf, Samir B.; Non-Final Office Action for U.S. Appl. No. 14/310,018, filed Jun. 20, 2014, mailed Sep. 21, 2015, 22 pgs.

Makhlouf, Samir B.; Notice of Allowance for U.S. Appl. No. 14/310,018, filed Jun. 20, 2014, mailed Nov. 2, 2015, 5 pgs.

Makhlouf, Samir B.; Notice of Allowance for U.S. Appl. No. 14/310,018, filed Jun. 20, 2014, mailed Mar. 10, 2016, 17 pgs.

Makhlouf, Samir B.; U.S. Patent Application entitled: System and Method for Engagement and Distribution of Media Content, U.S. Appl. No. 14/310,018, filed Jun. 20, 2014; 46 pgs.

Makhlouf, Samir B.; Non-Final Office Action for U.S. Appl. No. 14/925,409, filed Oct. 28, 2015, mailed Dec. 10, 2015, 19 pgs.

Makhlouf, Samir B.; Notice of Allowance for U.S. Appl. No. 14/925,409, filed Oct. 28, 2015, mailed Feb. 1, 2016, 9 pgs.

Makhlouf, Samir B.; U.S. Continuation Application entitled: System and Method for Engagement and Distribution of Media Content having U.S. Appl. No. 14/925,409, filed Oct. 28, 2015, 45 pgs.

Makhlouf, Samir B.; Extended European Search Report for serial No. 14183901.9, filed Sep. 8, 2014, mailed Nov. 12, 2015, 9 pgs.

Makhlouf, Sam; U.S. Provisional Patent Application entitled: System and Method for Reinforcing Brand Awareness with Minimal Intrusion of the Viewer Experience under U.S. Appl. No. 61/852,114, filed Mar. 15, 2013; 36 pgs.

Makhlouf, Sam; Applicant Initiated Interview Summary for U.S. Appl. No. 12/592,403, filed Nov. 24, 2009, mailed Dec. 23, 2014, 3 pgs.

Makhlouf, Sam; Applicant Initiated Interview Summary for U.S. Appl. No. 12/592,403, filed Nov. 24, 2009, mailed Mar. 28, 2014, 3 pgs.

Makhlouf, Sam; Final Office Action for U.S. Appl. No. 12/592,401, filed Nov. 24, 2009, mailed Oct. 15, 2012, 21 pgs.

Makhlouf, Sam; Final Office Action for U.S. Appl. No. 12/592,403, filed Nov. 24, 2009, mailed Oct. 15, 2012, 12 pgs.

Makhlouf, Sam; Final Office Action for U.S. Appl. No. 12/592,403, filed Nov. 24, 2009, mailed Nov. 17, 2014, 10 pgs.

Makhlouf, Sam; Final Office Action for U.S. Appl. No. 12/592,403, filed Nov. 24, 2009, mailed Nov. 7, 2013, 12 pgs.

Makhlouf, Sam; Non-Final Office Action for U.S. Appl. No. 12/592,401, filed Nov. 24, 2009, mailed Jan. 30, 2012, 25 pgs.

Makhlouf, Sam; Non-Final Office Action for U.S. Appl. No. 12/592,401, filed Nov. 24, 2009, mailed May 1, 2013, 25 pgs.

Makhlouf, Sam; Non-Final Office Action for U.S. Appl. No. 12/592,403, filed Nov. 24, 2009, filed Jul. 12, 2013, 16 pgs.

Makhlouf, Sam; Non-Final Office Action for U.S. Appl. No. 12/592,403, filed Nov. 24, 2009, mailed Feb. 1, 2012, 16 pgs.

Makhlouf, Sam; Non-Final Office Action for U.S. Appl. No. 12/592,403, filed Nov. 24, 2009, mailed May 26, 2015, 12 pgs.

Makhlouf, Sam; Non-Final Office Action for U.S. Appl. No. 12/592,403, filed Nov. 24, 2009, mailed Apr. 24, 2014, 11 pgs.

Makhlouf, Sam; U.S. Patent Application entitled: Media Content Distribution System and Method, having U.S. Appl. No. 12/592,401, filed Nov. 24, 2009, 98 pgs.

Makhlouf, Sam; U.S. Patent Application entitled: System and Method for Time Shifting Delivery of Media Content, having U.S. Appl. No. 12/592,403, filed Nov. 24, 2009, 99 pgs.

Makhlouf, Samir B.; Non-Final Office Action for U.S. Appl. No. 14/207,091, filed Mar. 12, 2014, mailed Apr. 15, 2016, 32 pgs.

Makhlouf, Samir B.; Issue Notification for U.S. Appl. No. 14/310,018, filed Jun. 20, 2014, mailed Apr. 6, 2016, 1 pg.

Makhlouf, Samir B.; Notice of Allowance for U.S. Appl. No. 14/925,409, filed Oct. 28, 2015, mailed Mar. 16, 2016, 17 pgs.

Makhlouf, Samir B.; U.S. Continuation Application entitled: System and Method for Engagement and Distribution of Media Content having U.S. Appl. No. 15/081,353, filed Mar. 25, 2016, 44 pgs.

Makhlouf, Samir B.; Issue Notification for U.S. Appl. No. 14/925,409, filed Oct. 28, 2015, mailed Jun. 22, 2016, 1 pg.

Makhlouf, Samir, B.; U.S. Patent Application entitled: System and Method for Engagement and Distribution of Media Content having U.S. Appl. No. 15/226,810, filed Aug. 2, 2016, 90 pgs.

Makhlouf, Samir; U.S. Patent Application entitled: System and Method for Distributing Media Content From Multiple Sources having U.S. Appl. No. 15/226,085, filed Aug. 2, 2016, 79 pgs.

* cited by examiner

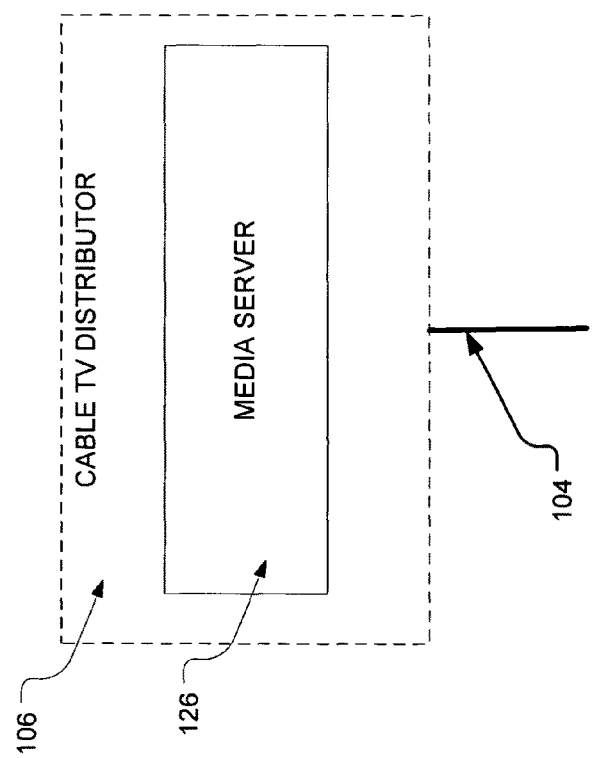

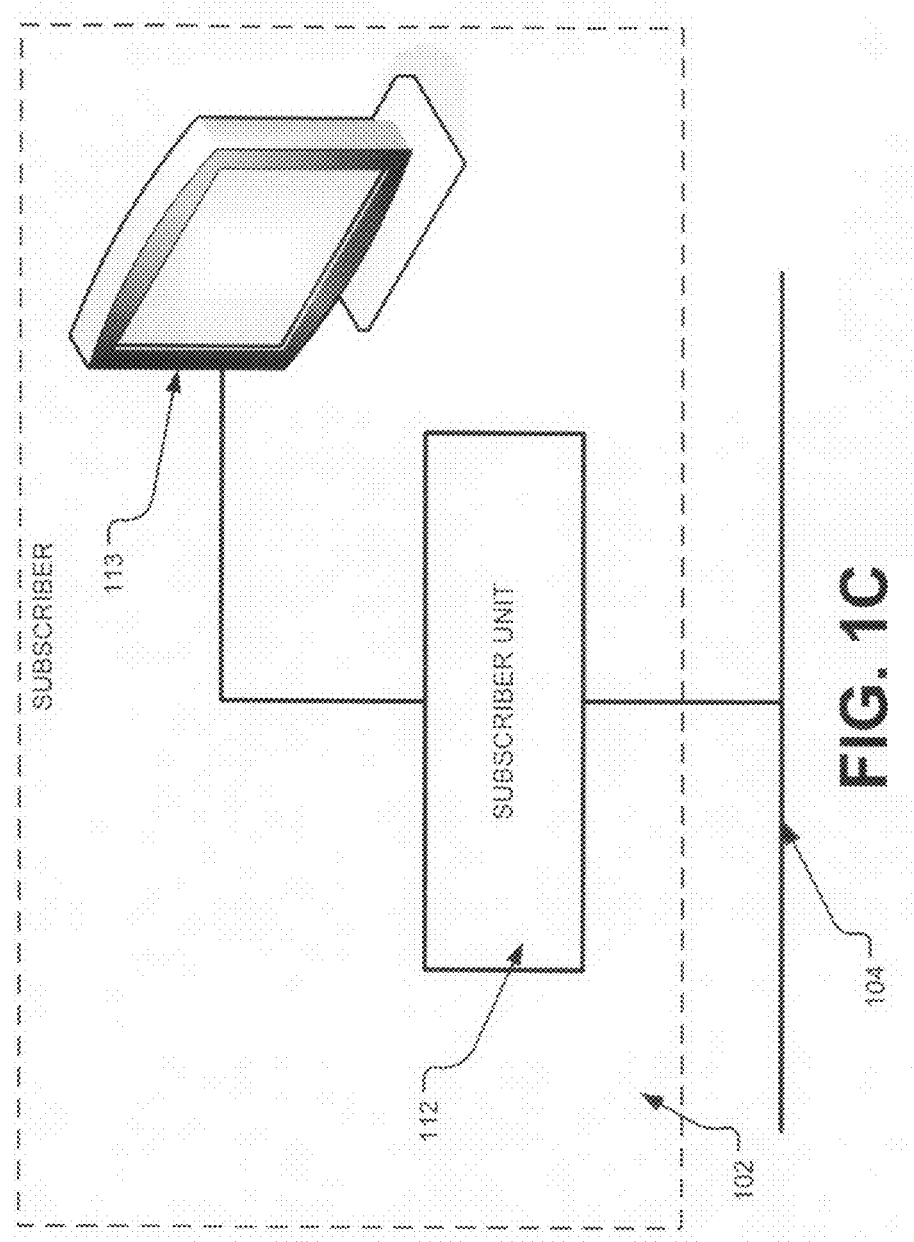

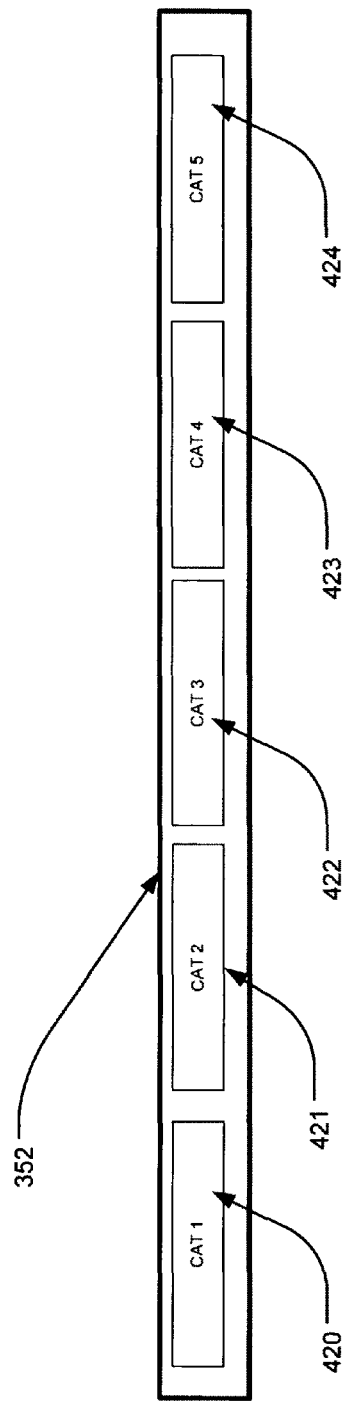
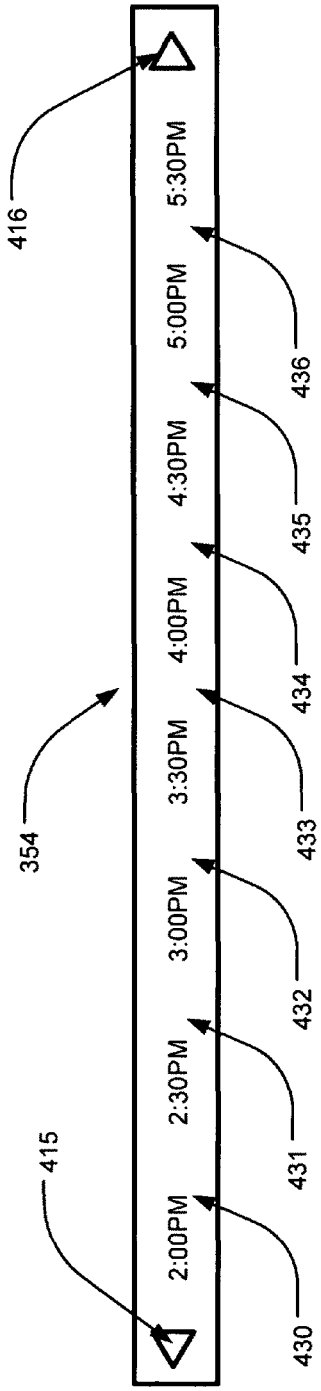
FIG. 4B
FIG. 4C

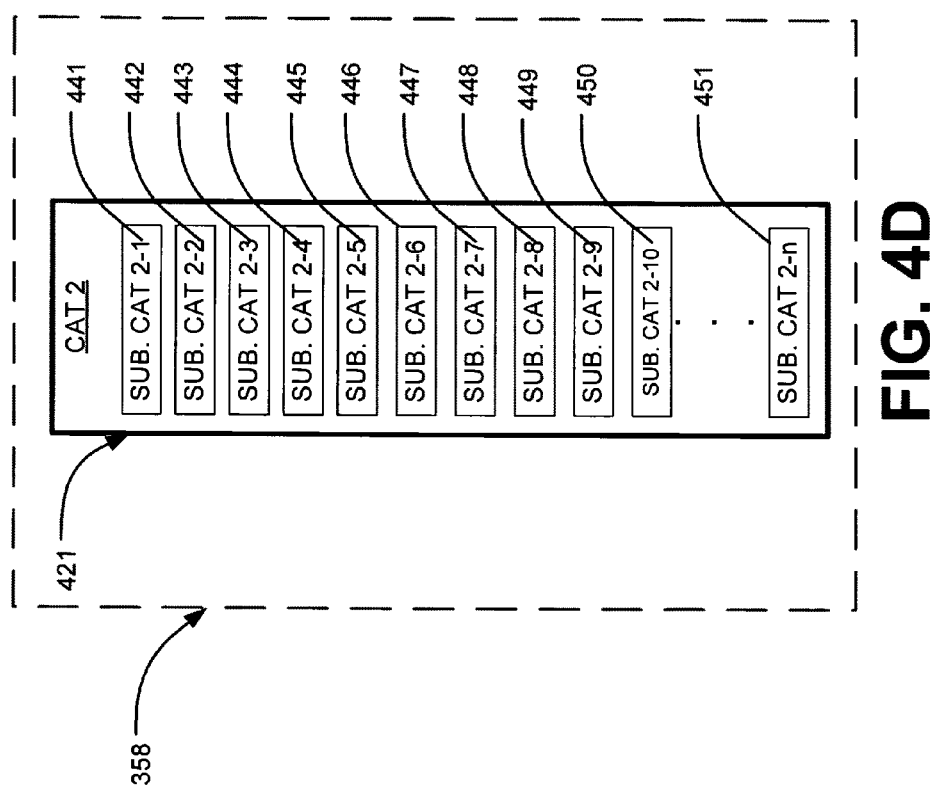

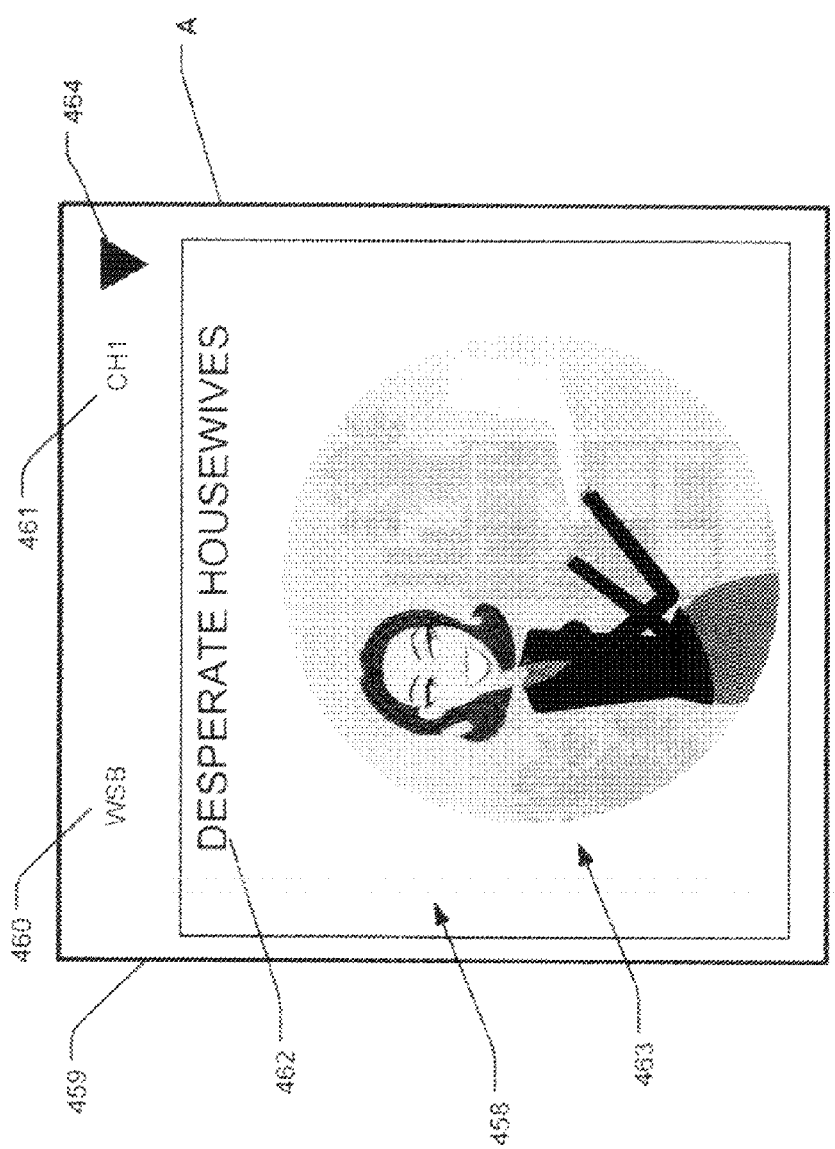
FIG. 4F1

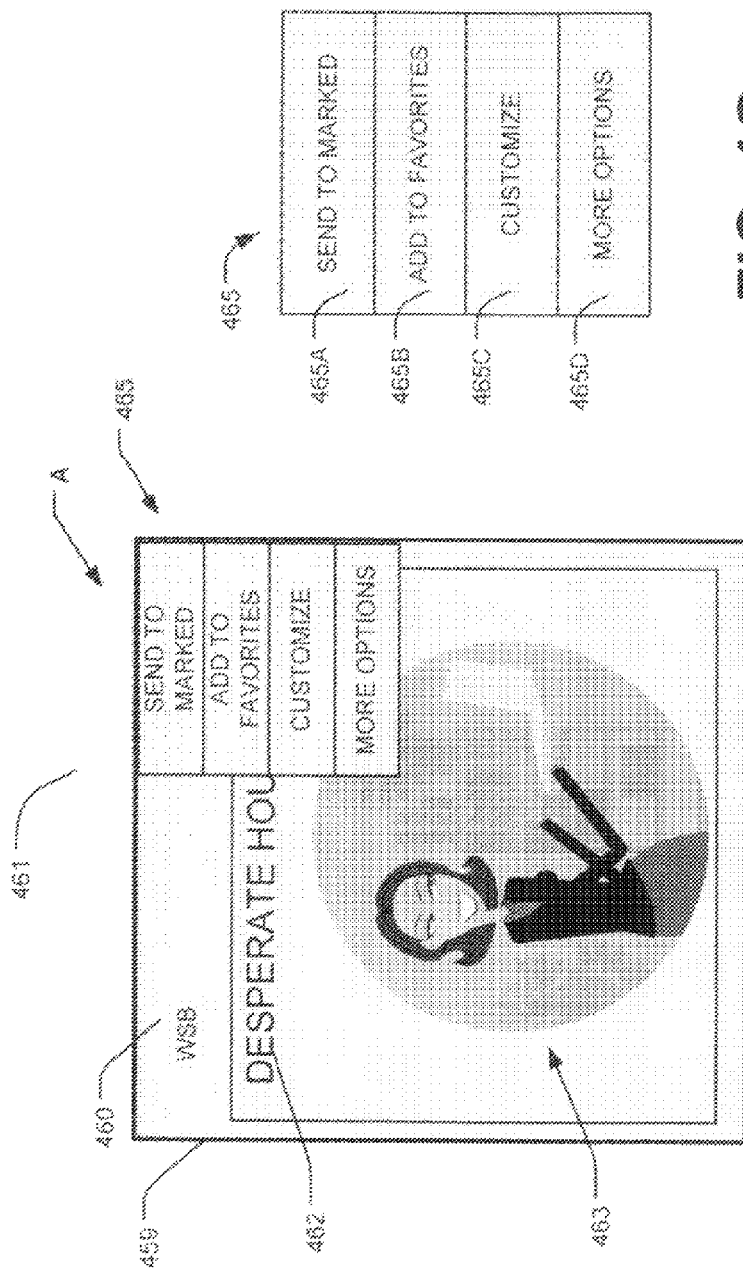

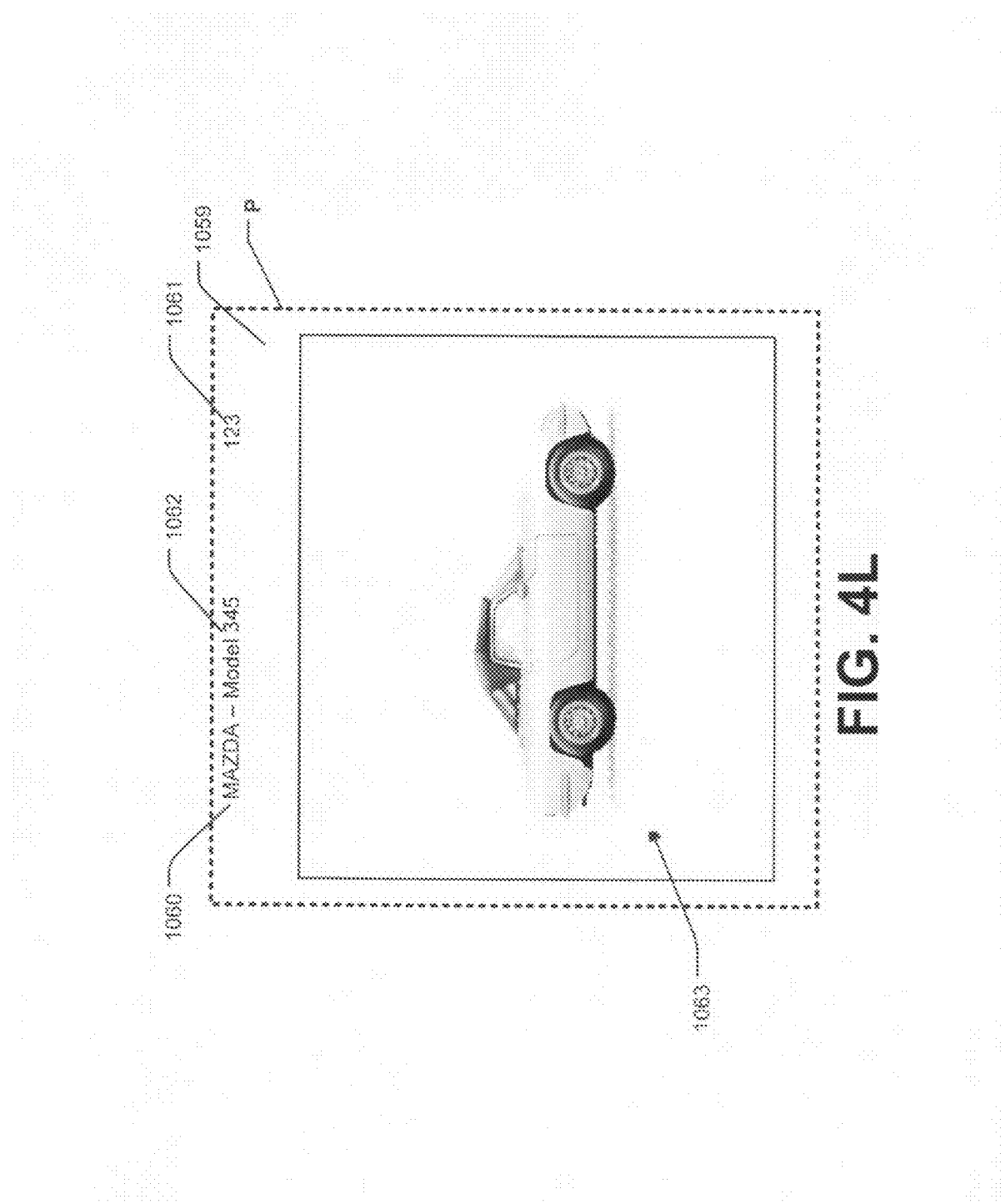

SYSTEM AND METHOD FOR DISTRIBUTING MEDIA CONTENT FROM MULTIPLE SOURCES

FIELD OF THE INVENTION

The invention is directed to a system and method for distributing media content (MC), including video programming from a cable television provider, to a subscriber. The system and method is configured to provide media content to a subscriber from a media content source based upon predetermined rules, including the number of times that the selected media content has been viewed/distributed to a subscriber. The MC may include video programming provided in a suitable video or audio format, such as, for example, NTSC, PAL, MPEG, Real Audio, Quicktime or other streaming video or audio formats, etc. MC may also include textual or photographic content available or otherwise accessible via the world wide web (WWW) and published at a predetermined universal resource locator (URL), including, but not limited to streaming video and/or audio, advertising, e-mail, photo files, music files, blogs, software applications, personal data, personal information managers, calendars, contact managers, merchant issued coupons, streaming video, voice messaging, text messaging, announcements, directories, maps and directions.

BACKGROUND

With reference to FIG. 1A, a typical cable television production and distribution system is depicted in a simplified form. In this system a content provider 108 provides a cable TV distributor 106 with video programming for the cable TV distributor to distribute to it's subscribers via a cable network 104. The content producer may be, for example, the party responsible for creating/producing one or more copyrightable works that are embodied in a full motion or video format (video programming) or it may be the party who owns the rights to such copyrightable works.

The content producer 108 will typically provide the video programming to the cable TV distributor via a satellite link 110 and/or a high speed broadband network system, such as, for example, the Internet 85, an ISDN network. In other cases the content producer will provide the video programming to the cable TV distributor on a recording media, such as magnetic video recording tape or an optical storage disk, such as a compact disk (CD). The cable TV distributor 106 provides it's customer/subscribers 102 with video programming (VP) via the cabling network 104. The cable network 104 may be composed of, for example, coaxial and/or fiber-optic cabling. VP is distributed to subscribers from the cable office 106 in either an analog or digital (MPEG) format via the cabling network 104. The VP is received by a television device associated with a subscriber 102 that is capable of receiving the analog or a digital signal and displaying video programming represented by the signal(s) on an associated display device (not shown). Alternatively, the VP may be received by a set top box (subscriber unit) 112 associated with the subscriber 102. The subscriber unit 112 is typically configured to convert the received signal(s) into a video format that can be fed to and displayed on an associated display device 113. Display device 113 may be a television or a display device with no RF tuning or video processing capability. The typical cable TV distributor 106 includes media storage for storing programming content received from a content producer 108 for a predetermined time, typically until it is distributed to subscribers via the cable network 104. The media storage 126 (See FIG. 1B) may be for example, one or more hard-disk drive based storage servers or magnetic-tape/cartridge based library management systems (LMS) on which video programming may be recorded on one or more magnetic tape cartridges or the like.

A subscriber unit 112 is often capable of bi-directional communication with the head end via the cable network 104 or via other networks such as, Digital Subscriber Line (DSL) available from most telephone service providers, or via wireless networks, such as WiMAX wireless networks based on the IEEE 802.16 standard (also called Broadband Wireless Access). Aside from converting the VP signal received from the cable TV distributor into a signal that can be displayed on an associated display device 113, the subscriber unit 112 will also provide a user/subscriber 102 with the ability to provide input to, for example, control the selection of video programming available from the cable TV distributor via one or the multiple channels over which the cable TV distributor will distribute video programming for display/viewing by a subscriber 102. In many typical subscriber units 102, the subscriber unit is configured to provide a numeric or alpha-numeric keypad and control buttons for receiving user input indicative of a user selection for programming (Not Shown). Further, many typical subscriber units are also configured to receive user input via a remote control device that is capable of providing a radio or infra-red signal that are generated by and emitted from the remote control device in response to user input made via the remote control device (Not Shown). The remote control device typically also includes a numeric or alpha-numeric keypad and/or control buttons for receiving user input indicative of a user selection for programming (Not shown).

With reference to FIG. 1C, many subscriber units 102 are also configured to generate and cause a channel/programming selection guide (programming guide) 130 to be displayed on an associated television/display device 113 for user reference/viewing and aid in making a programming selection. The subscriber unit 102 may also be configured to cause a cursor (not shown) or other graphical means of highlighting a portion of the displayed programming guide to be displayed and navigated based upon user input from the keypad or remote control device. Some examples of typical programming guides used by cable TV companies/services include inter-active programming guides (IPG), such as, for example The TV Guide™ IPG used by many cable TV distributors and satellite distributors.

A typical programming guide is generally depicted by the illustration of FIG. 1D. With reference to FIG. 1D, a typical programming guide 130 is displayed on a display device 113 in a two dimensional (2-D) grid like form with "time" 131 and "channel" 132 used as variables/headings that define the vertical and/or horizontal axis of the displayed programming guide 130. Textual titles of video programming scheduled to be distributed over the cable network 104 and available for viewing via subscribers 102 are shown for each channel at a scheduled time slot. The typical IPG shows only programming scheduled from the current time slot forward into the future and not programming schedule for time slots that have already elapsed, or precede the current time slot.

By using an associated keypad or remote control device (Not Shown), a user may "navigate" a cursor or other graphical indicia 135 to a displayed program title 136 or time slot 133 to select the programming scheduled for viewing at that time slot 133. Once selected, the subscriber unit 102 tunes/changes to the selected channel, or otherwise issues a signal to the cable TV office 106 which causes TV programming on the selected channel 137 to be displayed for viewing of programming in real time (broadcast time).

Some subscriber units are configured to record programming selected by a subscriber for viewing. These subscriber units will allow a user to select a currently available or future scheduled program to be recorded at the time it is scheduled for distribution/viewing by the cable TV distributor. This allows a subscriber who otherwise would not be available to view the desired program at the scheduled time to "time shift" the program so that they may view the program at another time convenient for them to do so.

Video programming that is distributed by the cable company to subscribers is typically produced by sources (content producers) 108 other than the cable TV distributor. These content producers license the programming to the cable company for distribution to subscribers. Typically, such licensing arrangements provide the cable company with the right to distribute the programming for only a single showing and only at a certain predetermined time/time slot.

As result of the above described method, most of the money a cable distributor pays to content providers is waste. A cable company normally pays a portion of the money it collects from subscribers to each of the content providers, for example; CNN, Fox News, History Channel, Discovery Channel and more (often more than 150 content channels) for the right to broadcast their content to consumers/subscribers. This content the Cable distributor pays for is available from every channel for every time slot in every day of the week. However, a consumer, and therefore all consumers, can watch only one channel, for example CNN, per time slot, thus the money paid to the other channels, for example the History Channel, Discovery channel and Fox News, for content broadcast during the same time slot is wasted as its is paid on behalf of all the consumers/subscribers to watch while only a percentage of the consumers/subscribers actually do watch a particular channel at a given time slot.

The video programming received from the content producer 108 is stored for at least a short period of time on a media server 126 before it is distributed by the cable TV distributor to subscribers 102 on the cable television system during a pre-scheduled time slot.

Once a cable television company has distributed a program over it's cable network 104, at a scheduled time, for viewing by subscribers, it is typically not possible for the program material to be viewed via the cable television system by a subscriber, unless the program was recorded by a subscriber using a recording device (such as a digital video recorder—DVR) that was deployed to record the selected program at/during the scheduled viewing time slot, or the cable TV distributor rebroadcasts the program at another time under a new license from the content producer/owner.

Cable television companies will typically include advertising that is interspersed with programming material when it is distributed to subscribers. This advertising provides the cable television company with an important revenue stream. Once a scheduled program has been distributed via the cable network at the scheduled time for subscriber viewing, there is no way that subscribers can view the program (or the advertising that is interspersed therein) unless the subscriber opted to have the program recorded at/during the scheduled viewing time slot.

Cable TV distributors typically only receive payment for advertising that is run during the original real time broadcast/distribution of a video program. In the case where a recording device has been used to record a program, a subscriber 102 may choose to fast forward, either automatically or manually, through portions of the recording in which the advertising is present thus negating the benefit to advertisers of the advertising placement and thereby weakening the value of advertising placement in programming to be distributed via broadcast, cable, satellite or any other means via which a subscriber may record a program and subsequently fast forward through advertising portions of programming.

Thus, a cable television distributor typically has one opportunity to get a subscriber to see the advertising interspersed with video programming. There is no way for a subscriber to view a video program distributed by the cable television company once it has been distributed for viewing, unless they (the subscriber) access a recording of the program or access the program via an alternate source of media content.

Currently, it is possible for a subscriber to access select television programs for viewing via online web-based video services such as HULU™ (www.hulu.com), BOXEE (www.boxee.com) or via web sites controlled and/or operated by the producer/owner such as, for example, ABC.com (www.abc.com) for programming produced by the American Broadcast Corporation (ABC), or Historychannel.com (www.Historychannel.com) for programming produced/owned by the History Channel. These alternate content sources are not accessible by a subscriber 102 using a subscriber unit 112. In fact to access these types of services a user must typically use another device, such as, for example, a personal computer (PC) to search for and access these web sites over the Internet.

These alternate media content sources offer advertising-supported streaming video of programming produced by various media content producers (producers). These services provide only select TV shows and movies from various content producers in one or more video formats, including, but not limited to Flash Video format. These programs may be available in 480 p and/or high-definition format. To access content from a web based video service, a subscriber must resort to a computer that will allow them to access the internet.

Other web based video services are provided by vendors such as, for example, NETFLIX™ by Netflix, Inc.; VUDU™ by Vudu, Inc. or ROKU™ by Roku, Inc. which provide their customers with a specialized device also known as an "over the top box" (OTTB), that allows a customer to access and cause selected programming to be displayed on a display device associated with the customer/OTTB. Importantly, the OTTB is separate and distinct from the subscriber box 112 provided by the cable TV distributor 106 and is limited to providing specific programming, such as, for example, old movies, available from a specific media storage site, group of storage sites or source.

These web-based video services are supported via purchases of the OTTB device and/or monthly subscription fees collected from subscribers. Limited advertising is interspersed (placed) in the programming, typically at the beginning and/or end of programming. However, the advertising placed in the programming is typically controlled by the parties who control the web-based video service. Revenue for such advertising goes to parties associated with the web-based video service on which advertisement is placed (and not to the cable TV distributor).

A consequence of these web based video services is that cable TV distributors typically receive no revenue when video programming is accessed/retrieved via the web based programming site. Further, while the content producers/owners receive some compensation by allowing programming they own to be made available on demand via these web based video sites, it is often less revenue than they may receive when their programming is distributed via a cable TV distributor. Further, to view content via a web based programming site, a user must access such site via use of, for example, a personal computer (PC) capable of accessing the Internet via a web browser. This generally requires a user to leave the environment in which their Television/system for viewing video programming from the cable distributor is located and move to another location/environment in which their PC device is located.

Typically a users PC is located in an environment that is not as comfortable as the environment in which they view programming via the cable TV distributor. Further, use of a PC device is often not conducive or convenient for multiple persons to simultaneously view.

Thus, a heretofore unaddressed need exists in the industry to address the aforementioned deficiencies and inadequacies. The features and advantages of the present invention will be apparent from the following description of the invention. The accompanying drawings, listed herein-below, are useful in explaining the invention.

SUMMARY OF THE INVENTION

The present invention provides a system and method of distributing video programming and other media content to subscribers. More particularly, the present invention is related to a system and method of distributing media content from multiple sources.

In one implementation of the invention a system is provided that includes a subscriber unit for receiving an input media content feed of a media content program selection from a first source upon determining that predetermined conditions exist and for receiving a media content selection from a second source upon determining that predetermined conditions do not exist.

In a further implementation a method of distributing media content from multiple sources is provided wherein the method includes the steps of determining whether media content has previously been distributed to the subscriber unit; where the media content has not previously been distributed to the subscriber unit, accessing a media content feed of the media content from a first source; and where the media content has previously been distributed to the subscriber unit, accessing the media content from a second source.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1B is a diagram generally depicting details of a typical cable TV system.

FIG. 1C is a diagram generally depicting equipment used by a subscriber to a typical cable television system for receiving cable TV programming.

FIG. 4B is a diagram generally depicting one embodiment of a category section 352 of a programming guide 350.

FIG. 4C is a diagram generally depicting one embodiment of a time bar 354 of a programming guide 350.

FIG. 4D is a diagram useful in explaining how a category button 421 may be associated with one or more sub-categories 441-451.

FIGS. 4F1 and 4F2 are diagrams generally depicting an example of a programming guide 350 in which one embodiment of an interactive storefront A is provided in association with predetermined video programming.

FIG. 4G is a diagram generally depicting an example of one embodiment of a over-hover 490 associated with an interactive storefront A.

FIG. 4L is a diagram generally depicting additional details of one embodiment of a hover-over window 1090.

FIG. 4O is a diagram generally depicting an example of one embodiment of a over-hover 1190 associated with an interactive storefront QQ.

DESCRIPTION OF THE INVENTION

The invention is directed to a system and method for distributing media content (MC), such as video programming, or other copyrightable subject matter, distributed via a cable television provider (cable TV distributor) or other source of video programming, to a subscriber via a subscriber unit. The MC may be either video programming provided in a suitable video format, such as, for example, NTSC, PAL, MPEG, etc. or web based content provided in, for example, html, xml, xtml, Flash or any one or more streaming audio and/or video formats. The proposed invention provides for a subscriber unit that is configured to retrieve, initiate or otherwise cause the distribution of media content (video programming and/or other copyrightable subject matter) available from web based sources and/or typical cable TV distributor sources to a display device associated with the subscriber unit.

Media content may be available from certain media content sources only at predetermined time slots. Other media content sources may make media content available on-demand/at will at any time that a subscriber may desire to access the media content. Media content sources that provide media content at predetermined time slots may be referred to as "scheduled" sources, while media content sources that provide access to media content on-demand/at will or otherwise without regard to a predetermined schedule may be referred to as "at-will" or "non-scheduled" sources.

In one embodiment of the invention, media content scheduled for a predetermined time slot or time slots (scheduled content) is provided to a subscriber unit from a scheduled media content source at the predetermined time slot(s). Once the media content has been delivered during the predetermined time slot(s), it may be transferred or otherwise put under control of a non-scheduled media content source from which it may be accessed "at-will" (as non-scheduled content) by subscribers without regard to timing/scheduling.

This proposed system and method solves problems Cable distributors have related to paying for programming content that consumers/subscribers will not get the opportunity to view because they are busy watching other content broadcast during the same time slot. Therefore, by enabling consumers to watch more programming content originally broadcast during the same time slots, for example 2, 3, 4 or more programs, at-will (as non-scheduled content) without regard to timing/scheduling, the cable distributor and the consumer will receive greater value for the money they pay for content.

Figure 2A:
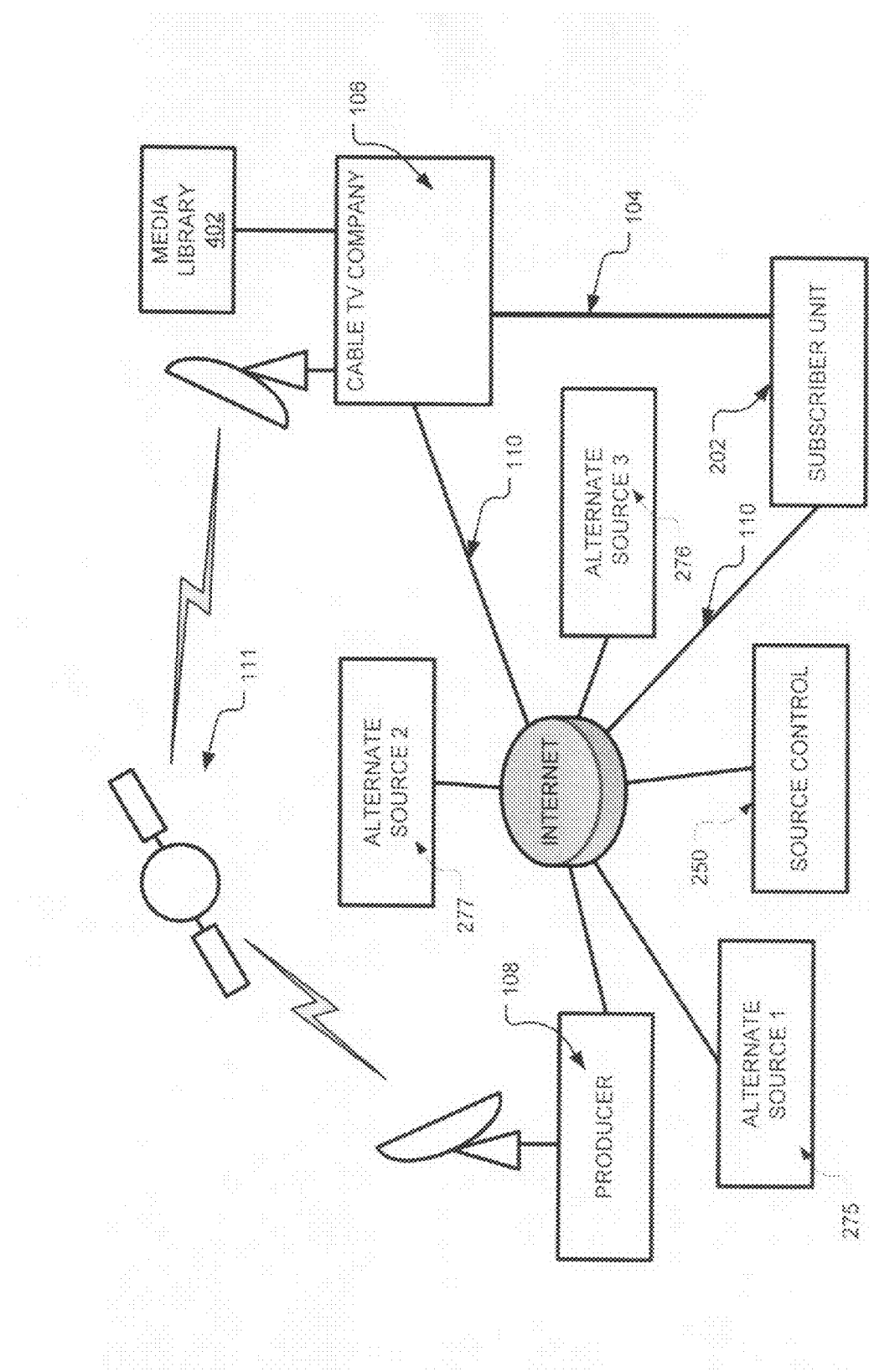
FIG. 2A is a diagram generally depicting a system for distributing video programming and media content to a subscriber via a subscriber unit 202.

FIG. 2A is a diagram depicting one embodiment of the invention. A cable TV and media content distribution system 200 is generally illustrated. In this system a cable TV distributor 106 is provided and configured to provide video programming or other copyrightable content to one or more subscribers via a subscriber unit 202. The cable TV distributor 106 may provide a signal(s) representative of the media content (for example: video programming) or other copyrightable content, to a subscriber unit 202 via, for example, a network 104. The network 104 may be, for example a wired, fiber optical or wireless network or a combination of these or other networking means. A content producer/owner 108 may be provided. The content producer/owner is the system and entity responsible for creating or controlling use of video programming and/or other copyrightable works embodied in a tangible medium of expression, such as, for example, but not limited to, video tape, optical disk, semiconductor memory, hard disk drive storage, or an electronic signal representative of the video program/copyrightable work/content. One or more alternate sources 275 may be provided. Alternate source 275 may be configured to provide an alternate source for programming/copyrightable content that might otherwise be available to the subscriber unit 202 via cable TV distributor 106.

The subscriber unit 202 may be configured to receive the signals from the cable TV distributor 106. Subscriber unit 202 may also be configured to transmit signals to the cable TV distributor 106 via the network 104. It may also be configured to connect to the Internet (or another broadband network) via, for example an Internet Service Provider 180.

In one embodiment of the invention the cable TV distributor 106 includes a cable TV Distribution and Control System which may be configured to provide video programming to a subscriber unit 202 via a network, such as a wireless network or cabled network 104. Alternatively, this video programming may be provided to the subscriber unit 202 via another network, such as, for example, the Internet.

Figure 2B:
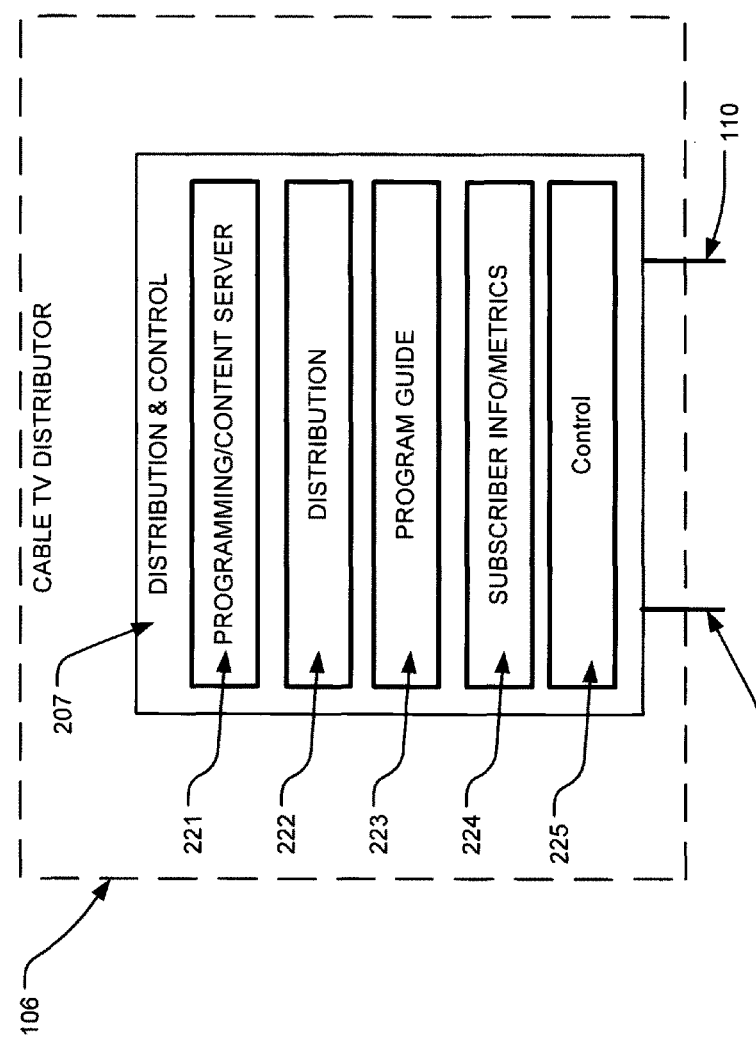
FIG. 2B is a diagram generally depicting an embodiment of a distribution and control unit 207.

FIG. 2B generally depicts an embodiment of Distribution and Control System (DCS) 207. In this embodiment the DCS 207 may be configured to include: a programming/content server unit 221; a distribution unit 222; and a program. Guide unit 223 and/or a subscriber information and metrics unit 224. The distribution and control system 207, in whole or in part, or the functionality thereof, in whole or in part, may alternately be included as or incorporated into the source control 250 and/or the subscriber unit 202, or vice-a-versa.

Programming/content server unit 221 may be configured to store video programming or other copyrightable content received from, for example, a content producer 108 for a predetermined time, typically until it is distributed to subscribers via the (wired or wireless) cable network 104. The programming/content server unit 221 may be for example, one or more hard-disk drive or semi-conductor based storage servers, or magnetic-tape/cartridge based library management systems (LMS) or the like on which video programming may be recorded on one or more magnetic tape cartridges or the like.

Distribution unit 222 may be configured to control the receipt of programming materials from content producers 108. It may also be configured to control and/or coordinate distribution of programming stored on the programming/content server unit 221 to subscriber units 202 via, for example, the network 104 or the Internet.

Program Guide unit 223 may be configured to generate, assemble and distribute programming guide data to subscriber unit 202. It may also be configured to generate and publish an interactive programming guide at a predetermined universal resource locator (URL) that may be accessed and viewed by a subscriber via use of a subscriber unit 202 and associated display device.

The associated display device may be, for example, but not limited to, a light emitting diode (LED) display, liquid crystal (LCD), plasma, cathode ray tube (CRT) or other type of display capable of displaying text, graphics, full motion pictures, static imagery and/or other copyrightable subject matter. Further, the associated display device may be, for example, but not limited to, a touch sensitive display device capable of receiving/recognizing user input via touch/contact with the display device. The display device may be a stand alone device or a display device that is included as a part of, for example, the subscriber unit 202. Further, the display device may be a display that is incorporated into another independent device, such as, for example, but not limited to, a telephone device, personal computer (PC), television receiver or remote control device.

Subscriber information and metrics unit 224 may be configured to collect and/or store subscriber information such as, for example, identity, preferences, billing information, purchase/advertising placement history, receipts and warranties associated with purchased products, important dates and/or personal reminders. It may also be configured to collect and/or store collect and/or store subscriber viewing history and preferences. Further, subscriber information and metrics unit 224 may also be configured to calculate and/or compile statistics based upon collected subscriber information and viewing history/choices.

With reference to FIG. 2A, media content, such as, for example, video programming received by a cable TV distributor 106 from a producer of media content (content producer) 108. Once received, the media content may be stored on a programming/content server unit 221 (See FIG. 2B) associated with the cable TV company 106 (see FIG. 2A). The programming/content server unit 221 may be configured to include, for example, one or more hard-disk drive based storage servers, optical disk servers or readers, magnetic-tape based library management systems (LMS) on which video programming may be recorded on one or more optical disks or magnetic tape cartridges or the like. The programming received from the content producer 108 may be stored for at least a short period of time on the programming/content server unit 221 before it is distributed by the cable TV distributor 106 to subscribers 202, via network 104 or other network, such as, for example, the Internet, on the cable television system during a pre-scheduled time slot.

Figure 2C:
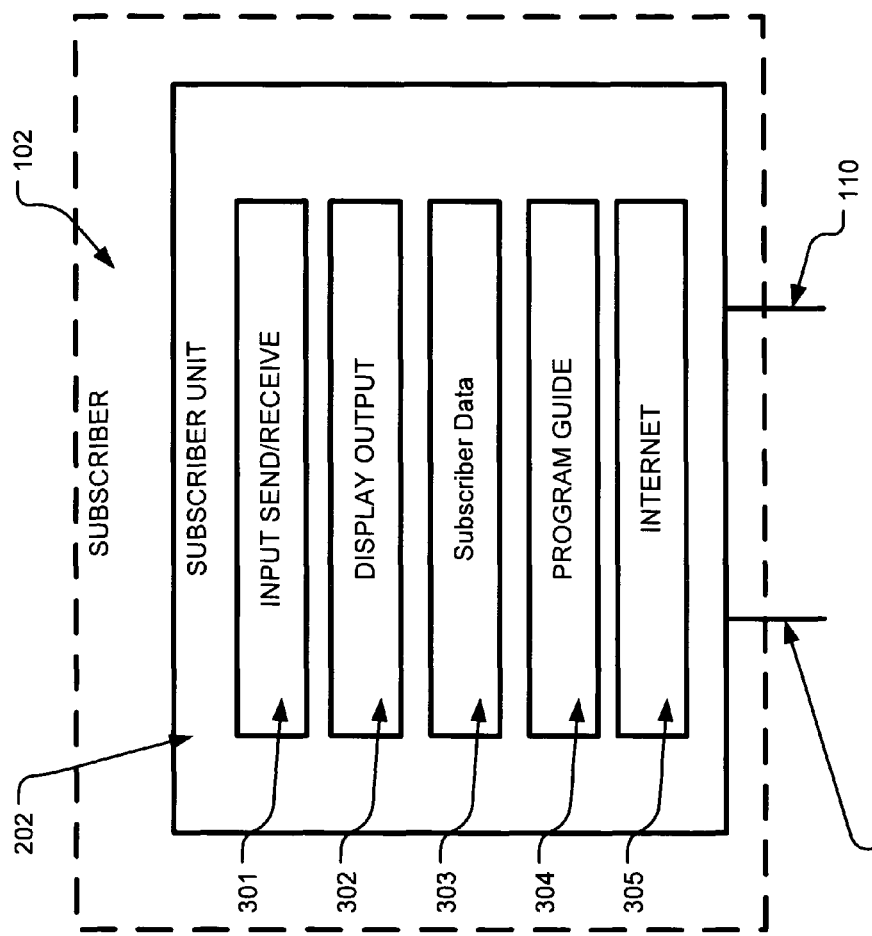
FIG. 2C is a diagram generally depicting details of an embodiment of a subscriber unit 202 according to the invention.

A subscriber unit 202 may be provided for each subscriber 102. In one embodiment generally depicted in FIG. 2C, subscriber unit 202 may be configured to include: a display output unit 302 for converting signals/data received from the cable TV distributor 106 or one of alternate source(s) 275 into a signal format compatible with an associated display device 113 (not shown). A subscriber data unit 303 may be provided and may be configured to store and/or collect data about and concerning subscriber viewing habits, preferences and communicating such with a cable TV distributor 106. A program guide unit 304 for receiving and storing program guide data for use in presenting and displaying a program guide on an associated display device 113 may be provided. The program guide unit 304 may be configured to receive programming guide data, such as, for example, program titles, time of broadcast/distribution, channel or source of such broadcast/distribution from a predetermined source, such as, for example, the cable TV distributor 106 or another source of program guide information. It may also be configured to publish a programming guide 230 at a predetermined universal resource locator (URL) in a predetermined format, such as, for example, HTML, XTML and/or other well known formats suitable for access and viewing via a web browser application. This programming guide may be hosted on a server associated with the cable TV distributor 106, on a server accessible via the Internet or locally on storage memory associated with the subscriber unit 202.

An Internet unit 305 may be provided and configured to access and/or communicate with one or more pre-determined sources for video programming via an Internet connection or other network connection. The predetermined source or sources may be, for example, a cable TV distributor 106, a web based source for streaming video, or another source from which full motion programming or other copyrightable material may be accessed, retrieved or otherwise received via a predetermined network such as, for example, a network 104 or the Internet 110 or a combination of one or more of these.

Preferably a subscriber unit 202 is provided for each display device 113 on which a subscriber 102 desires to view programming (media content) provided via the cable TV system. The display device 113 may be a television or a dedicated CRT, LCD, plasma or other type of display device. The display device 113 may be connected to receive video signals or stream video via the subscriber unit 102 via either a wired conduit or a wireless interface. The functionality of the subscriber unit 202 may be provided as a device that is separate and distinct from televisions and other display devices 113 that will be used to view programming or it may be provided as a part of a television or display device 113 that will be used by a subscriber to view programming distributed via the cable television TV system.

In a preferred embodiment, the subscriber unit 202 is configured to receive video programming from the cable TV distributor 106 via a cable network 104. It may also be configured to access and communicate with one or more predetermined web based sources (alternate sources) 275 via, for example, the Internet via an Internet connection 110 or another predetermined network. The Internet connection may be provided via the cable TV distributor 106 via the cable network 104 of the cable TV distributor 106 or it may be provided via a separate Internet service provider (ISP) 180.

Alternate source 275 may be, for example, a web based video service, such as, for example, HULU™ or web based video services provided or controlled by a particular content producer/owner. For example, the American Broadcasting Corporation (ABC) operates or controls an on-line web site (www.ABC.com) via which video programming or other copyrightable content is available for access and viewing after it has been originally broadcast by the American Broadcasting Corporation. These web based sites provide streaming video programming to users via, for example, the Internet, that is separate and distinct from the cable TV distributor 106. In one embodiment, the alternate source 275 is associated with and controlled via the cable TV distributor 106. In this embodiment, the cable TV distributor 106 may store programming received from a producer 108 for access and distribution to subscribers subsequent to the distribution of the program at the scheduled time slot shown on the programming guide.

Figure 2D:
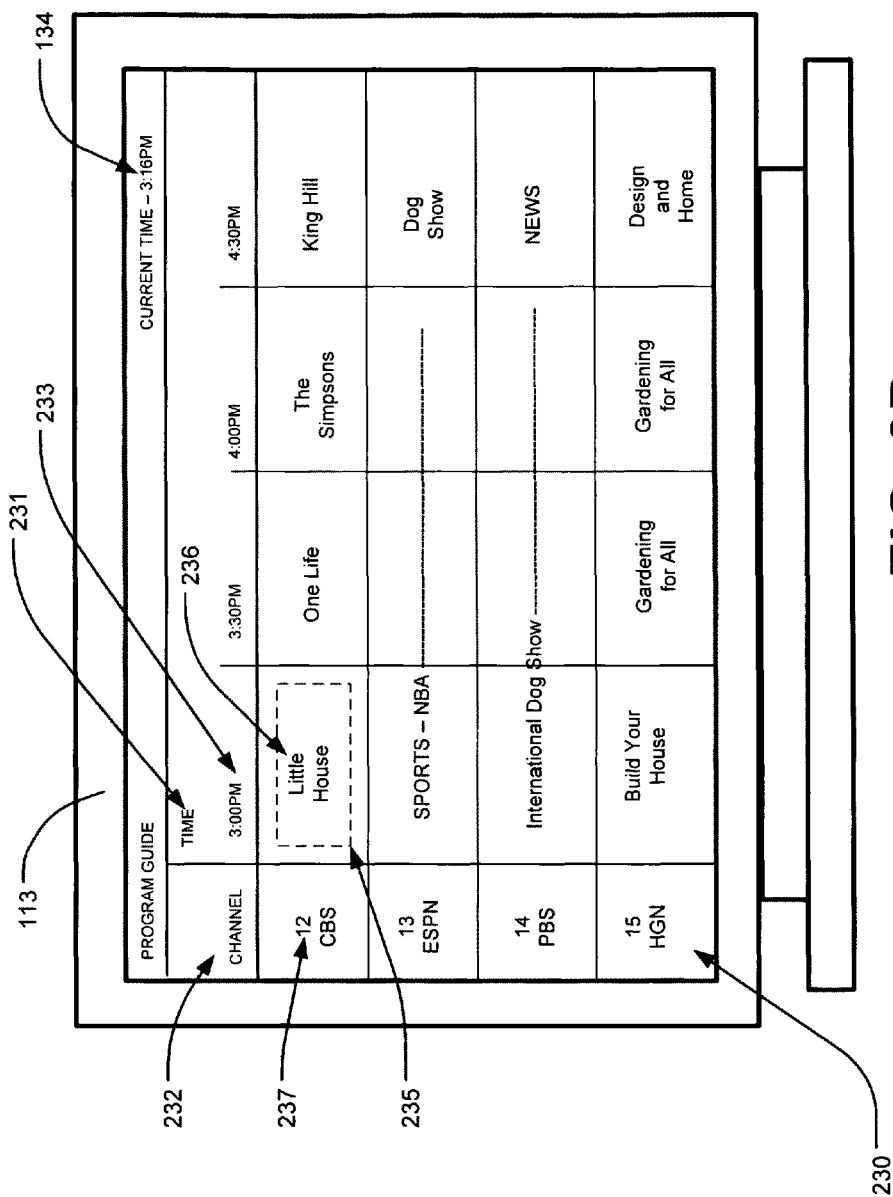
FIG. 2D is a diagram generally depicting an example of one embodiment of a programming guide 230 provided to subscribers via a display device 113 that is associated with a subscriber unit 202.

With reference to FIG. 2D the subscriber unit 202 may be configured to display/cause to be displayed a programming guide 230 on a display device 113 in a two dimensional (2-D) grid like form with "time" 231 and "channel" 232 used as variables/headings that define the vertical and/or horizontal axis of the displayed programming guide. Titles of programming scheduled to be distributed and available for viewing via the cable television system are shown for each channel at a scheduled time slot. By using an associated keypad or remote control device (Not Shown), a user may "navigate" a cursor or other graphical indicia 235 to a displayed program title 236 or time slot 233 to select the programming scheduled for viewing at or during that time slot 236.

Figure 2E:
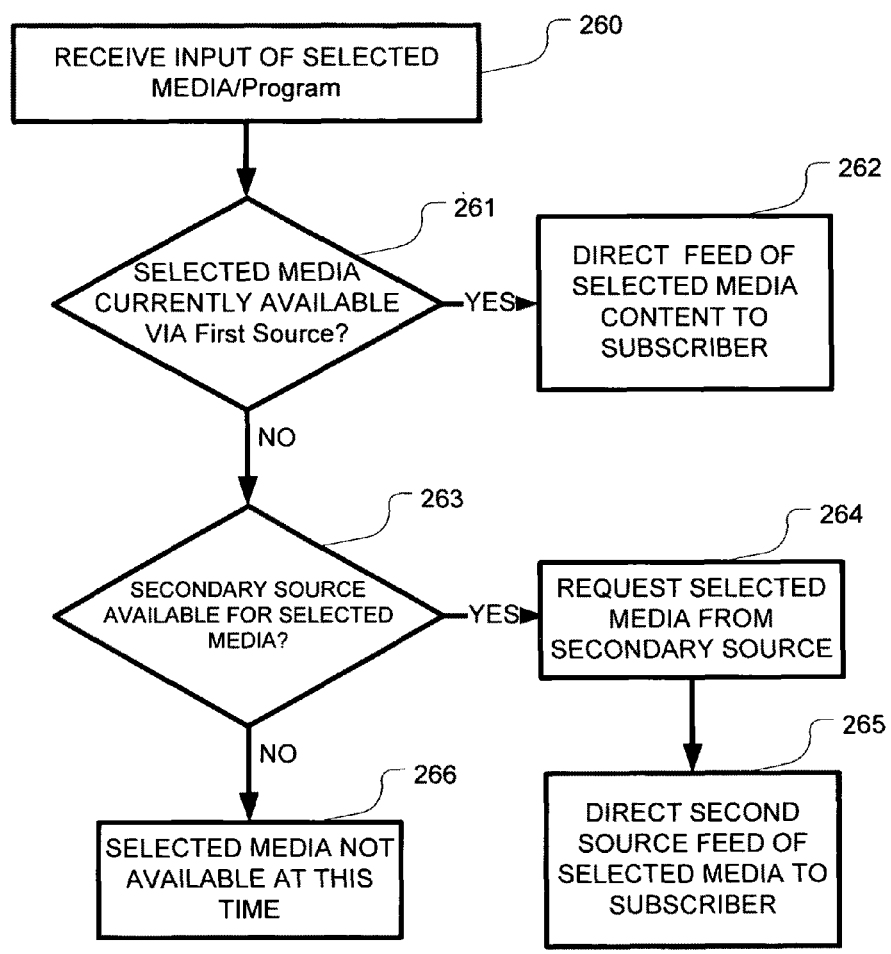
FIG. 2E is a flowchart generally summarizing a process for providing video programming and/or media content to a subscriber via a subscriber unit 202.

With reference to the flowchart of FIG. 2E, upon receiving user input 260 via an interactive program guide 230 (See FIG. 2D) indicative of a selection, the subscriber unit 202 will determine whether the selected media content is currently available via a first media source, such as a video feed then currently being distributed from the cable TV distributor via a network 104 (261). This determination might be done by comparing the scheduled time slot of the selected media content with the then current time 134. Where the then current time 134 falls within the scheduled time slot for the media content, it can be said that the feed of the selected media content is then currently available from, for example, the cable TV distributor 106. In this case, the subscriber unit 202 will select, for example, the cable TV feed of the selected media content (channel/programming) from the cable TV distributor for display on an associated display device 113 (262). If the media content selection is not currently available from the first source (example: cable TV distributor), the subscriber unit 202 will determine if an the selected media content is available from an alternate source (secondary source) (263). If an alternate source is available, the subscriber unit 202 will cause the alternate source to be accessed (264) and initiate the download or feed of streaming media content such as, for example, a video and/or audio feed from a storage server associated with the alternate source and display the program from the alternate source on the display device 113 associated with the subscriber unit 202 (265), otherwise if an alternate source is not available, then the media is not available (266). In this way, it is possible for a subscriber to be provided the convenience of a single device for selecting and viewing a selected program from whatever source it may then be currently available from, whether the source is web based or a cable TV distributor video feed. It also may give priority to one source, such as the video feed from the cable TV distributor, over another, such as a web based streaming video site, when the selected programming is then currently available from more than one source. The functionality of the subscriber box in determining and providing a source of programming for viewing may be incorporated into or otherwise carried out by, in whole or in part, source control 250 (FIG. 2B). The first media content source may be either a scheduled source or a non-scheduled source. The secondary source may be either a scheduled source or a non-scheduled source.

The subscriber unit 202 may also be configured to provide a user with a selected program, or other copyrightable material, accessed/retrieved from one of several available alternate sources 275, based upon certain predefined criteria, such as, for example, the number of times a selected program has been viewed by the subscriber or the time period during which the selection is made.

Where there exists multiple sources via which selected programming content may be obtained and provided to a subscriber via the subscriber unit 202, it is possible to assign each source a priority by which the subscriber unit 202 will access/retrieve selected programming. For example, each source may be assigned viewing or distribution rights (viewing rights) in connection with a program title. In this example, and with reference to FIG. 2F, for given program title it is possible to pre-define when a particular source will be accessed to provide a subscriber with a selected program title. For example, sources may be assigned the right to provide/distribute a program title to a subscriber based upon the number of times the selected program title has been distributed to or viewed via the subscriber unit 202. One source may be assigned the right to distribute the program title to a subscriber the first time the title is distributed, while a second source may be assigned the right to distribute the program title to a subscriber the second time the title is distributed to a subscriber. Further, the right to distribute the program title to a subscriber the third time the title is distributed to a subscriber may be assigned to yet a third source.

Figure 2F:
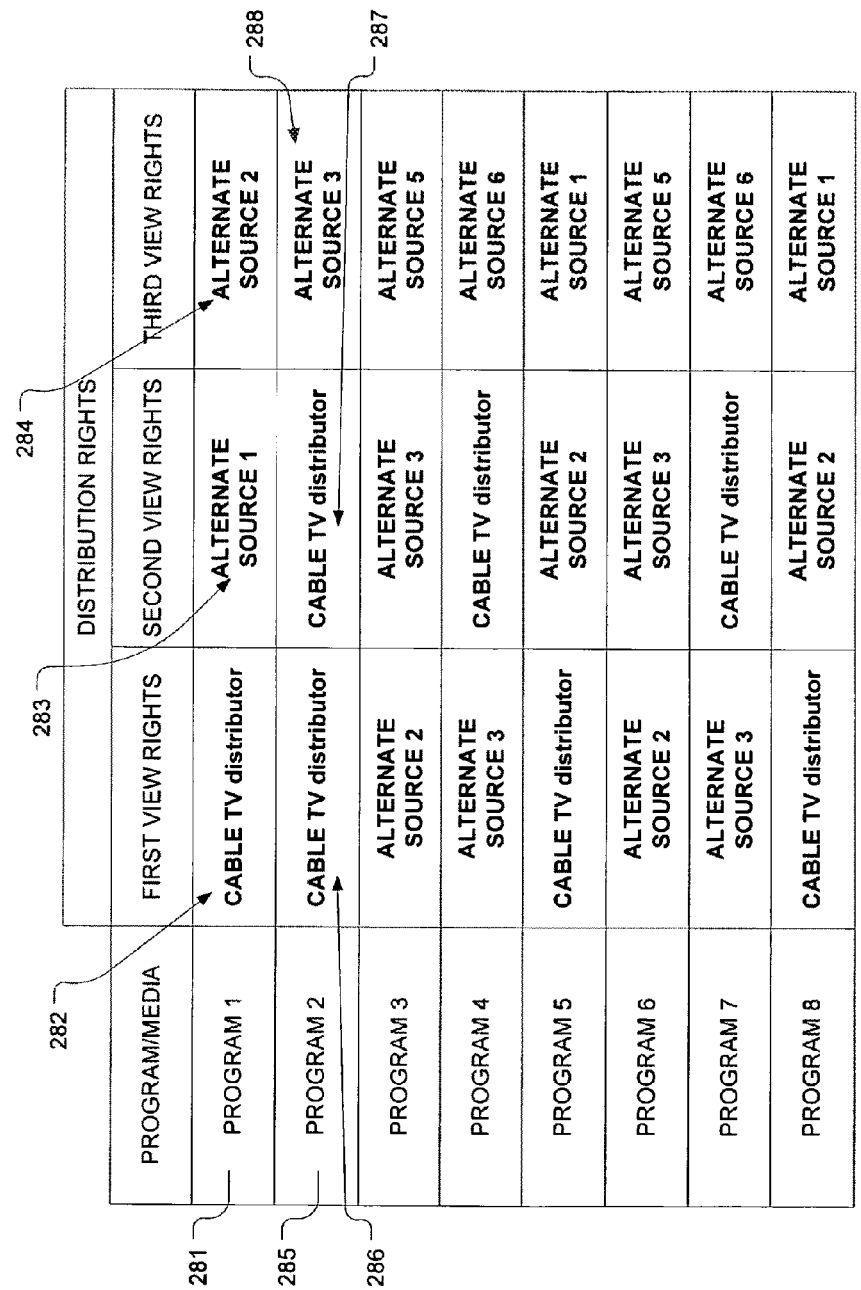
FIG. 2F is a generally describing how sources for programming may be assigned priority for one or more viewings of programming delivered to a use via a subscriber unit 202.

In FIG. 2F, a chart is shown that generally sets out how viewing rights may be assigned to a specified source for a given video program. For example, with respect to a "program 1" 281, first viewing rights have been assigned to the "Cable TV Distributor" 282, second viewing rights have been assigned to the "Alternate Source 1" 283 and third viewing rights have been assigned to the "Alternate Source 2" 284. With respect to "Program 2" 285 first viewing rights have been assigned to the "Cable TV Distributor" 286, second viewing rights have also been assigned to the "Cable TV Distributor" 287 and third viewing rights have been assigned to an "Alternate Source 3" 288. The assignment of viewing rights may be negotiated between the various parties involved and base upon, for example, payment of fees, a specific time period, time of day, number of times programming has previously been viewed or other factors.

In another embodiment, the subscriber unit 202 may be configured to access/retrieve a program selection, or other copyrightable material, from any one of several sources based upon predetermined conditions, such as, for example, the number of times the selected program has been delivered to or viewed via the subscriber unit 202. In one implementation, the subscriber unit 202 may be configured to access/retrieve a program selection from a first or "primary" source, such as the cable N distributor 106 when it is determined that the subscriber/subscriber unit has never previously viewed/requested the media selection before. Similarly, the subscriber unit 202 may be configured to access/retrieve a program selection from an alternate source 275 where it is determined that the subscriber/subscriber unit has viewed/requested the selection at least one time previously. Further, where it is determined that the selection has been viewed or requested by the subscriber/subscriber unit more than some predetermined number of times, or has been viewed for longer than some predetermined minimum period of time, the subscriber unit 202 may be configured to access/retrieve a program selection from a further predetermined alternate source 275.

Other criteria may also be used to determine from which source (primary, secondary, tertiary, etc.) a programming selection will be accessed/retrieved by the subscriber unit 202 for a subscriber to view. Some other examples of criteria on which source selection can be base include, but are not limited to, the time of day; geographic locale of a subscriber unit 202; time of year, or a specific time period etc. In one embodiment of the invention, a cable TV distributor source/video feed are categorized as primary media sources. Programming available from the primary source at the time a subscriber selects programming for viewing will be accessed/retrieved and provided for viewing on a display device 113 associated with the subscriber unit 202.

The identity of alternate sources 275 and related universal resource locator (URL) information for each program selection identified via user interaction with the programming guide (130), may be collected and/or stored by the subscriber unit 202 or otherwise decoded or read from programming guide information provided to the subscriber unit 202 via the cable TV distribution and control system 207 (see FIG. 2B). Alternatively, the subscriber may manually enter such information via keypad or remote control (not shown) of the subscriber unit 202.

Time Shifting

In one embodiment of the proposed invention the subscriber unit 202 is configured to select a first source for a selected program when the current time coincides with the time slot when the selected program will be broadcast via the cable TV distributor 106 and to select a second source for the selected program when the then current time falls outside of the time slot when the selected program will be broadcast via the cable TV distributor 106. In a preferred embodiment, the first source may be, for example, a cable TV broadcaster 106, while the second source is a media storage server on which a copy of the selected program is available/stored subsequent to the original broadcast via the cable TV company. In this way, subscribers can view programming that has already been distributed via the cable TV distributed without having to engage recording equipment/systems to create a recording of the selected program when it is originally distributed to the subscriber unit 202 during the schedule broadcast time slot.

In this case, the subscriber unit 202 is configured to access/retrieve the pre-selected program stream from the second source to which a copy of the program has been stored. In this way, subscribers are able to achieve the same result as if they had engaged a video recording device to receive and record a program at the time the program was distributed for viewing to subscribers. The media library 402 (see FIG. 2A) may be owned/controlled by the cable TV distributor or another party not related to the cable TV distributor. For example, a streaming video service such as, for example, HULU™ (www.Hulu.com), ABC.com or other web based streaming video services provided by, for example, movie studios or television production companies, could be used as the media library 402 and accessed by the subscriber unit 202 accordingly to provide a subscriber with desired "recorded"/"time-shifted" programming. The media library 402 may be comprised of one or more media separate media sources, some, all or none of which are owned or controlled by the cable TV distributor or any single entity. Each media source may be configured to store programming produced by one or more predetermined content producers.

As the optical fiber cable networks 104 used by many cable TV distributors to distribute video programming to subscribers typically provides via high bandwidth, it may be preferable that video and other media content stored on servers/server systems after original broadcast, be accessed and distributed to subscriber via these cable TV distribution cable networks 104.

Figure 3A:
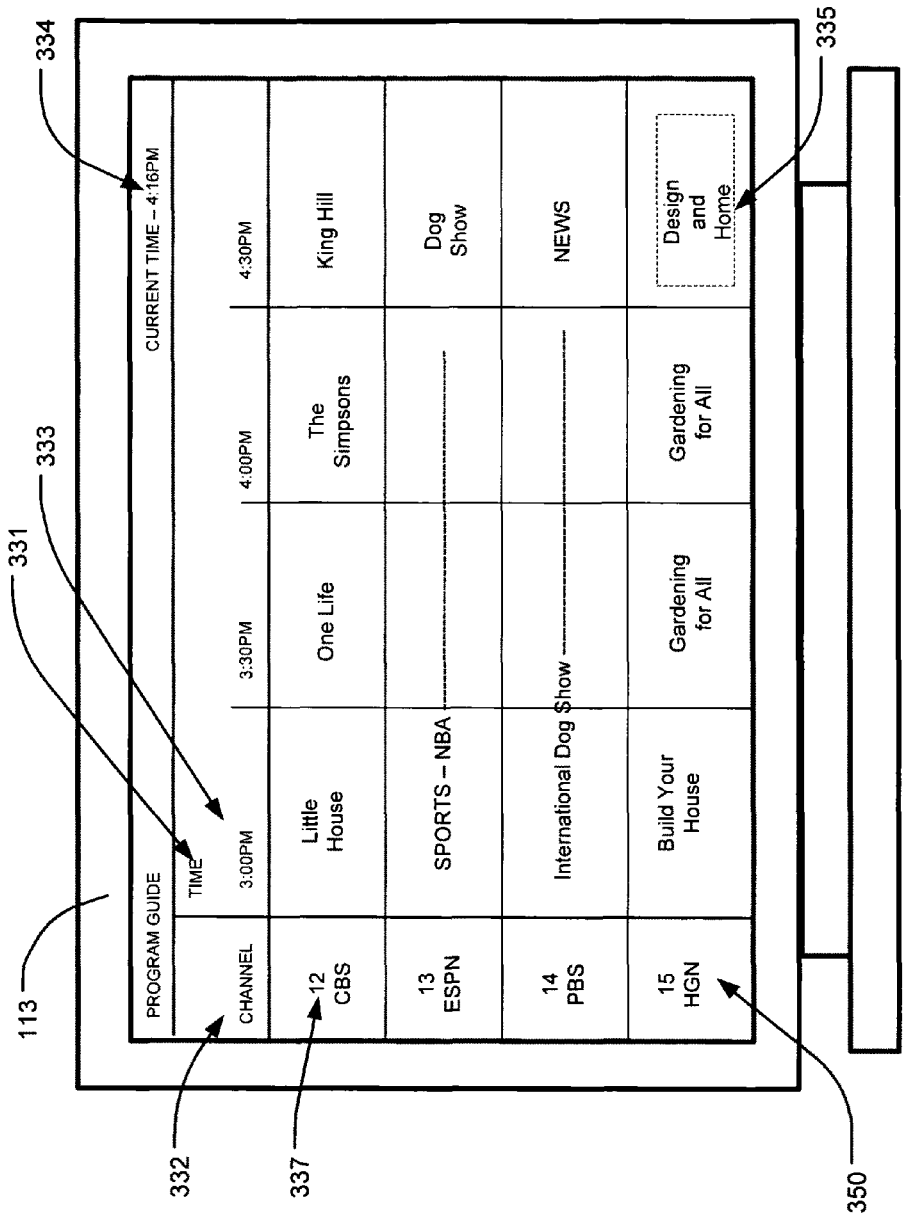
FIG. 3A is a diagram generally depicting an example of one embodiment of a programming guide provided to subscribers via a subscriber unit 202.

With reference to FIG. 3A, the subscriber unit 202 may be configured to provide a programming guide 350 in which scheduled programming is displayed not only for current and future scheduled programming, but also for past programming that was scheduled and distributed via the cable TV distribution system prior to the then current time.

FIG. 3A is a diagram generally depicting a programming guide 350 displayed on a display device associated with subscriber unit 202. In this embodiment, the displayed programming guide 350 may be in a two dimensional (2-D) grid like form with "time" 331 and "channel" 332 information set out. Titles of programming scheduled to be distributed and available for viewing via the cable television system are shown for each channel at a scheduled time slot. In addition, the programming guide displays previously scheduled and distributed programming.

Figure 3B:
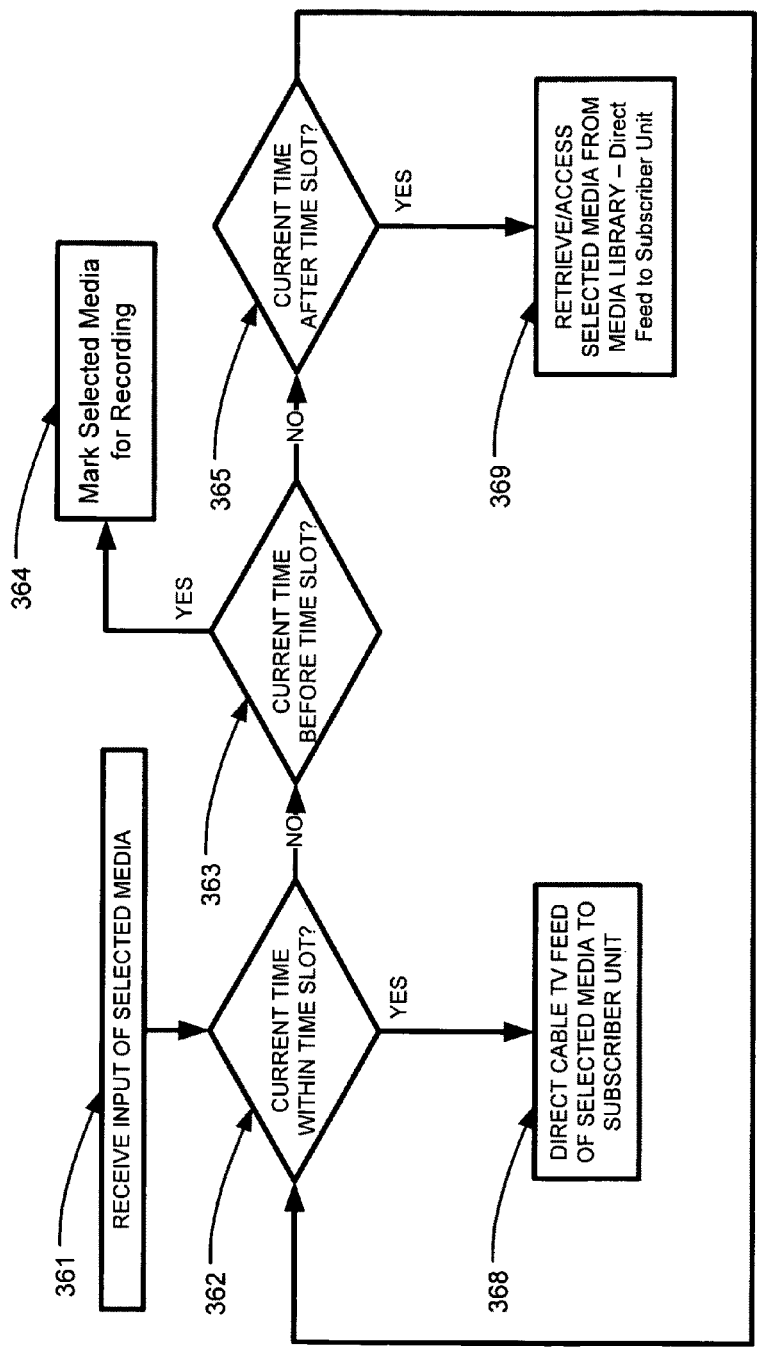
FIG. 3B is a flowchart generally depicting a process of one embodiment of the present invention.

With reference to the flowchart of FIG. 3B, by using an associated keypad or remote control device (Not Shown), a user may "navigate" a cursor, pointer or other graphical indicia 335 to a displayed program title 336 (not shown) or time slot 333 to select the programming scheduled for viewing at that time slot 333. Once selected, the subscriber unit 202 may be configured to receive the input of the selected program (361). A determination is then made as to whether or not the then current time falls within the time slot scheduled for showing of the selected program (362). If not, it may then be determined whether or not the current time is before the time slot scheduled for showing of the selected program (363). If the then current time is before the scheduled time slot, the program selection may be "marked" for "recording" once the selected program is distributed/shown at the scheduled future time slot (364). If the then current time is within the scheduled time slot (362) then the direct cable TV video feed of the selected program will be directed via the subscriber unit 202 to an associated display 113 for viewing (368). If the then current time falls after the scheduled time slot of the selected program, then an alternate source 275 where the selected media will be accessed/retrieved from and directed via the subscriber unit 202 to an associated display for viewing (369). In one embodiment, where the current time falls after the scheduled time slot of the selected program, the selected media may be accessed/retrieved from, for example, a media library 402 (FIG. 2A) that is associated with the cable TV distributor 106 that is configured to store video programming, or other copyrightable material, once it has been originally showing/distributed for viewing by the cable TV distributor during a scheduled time slot.

Figure 3C:
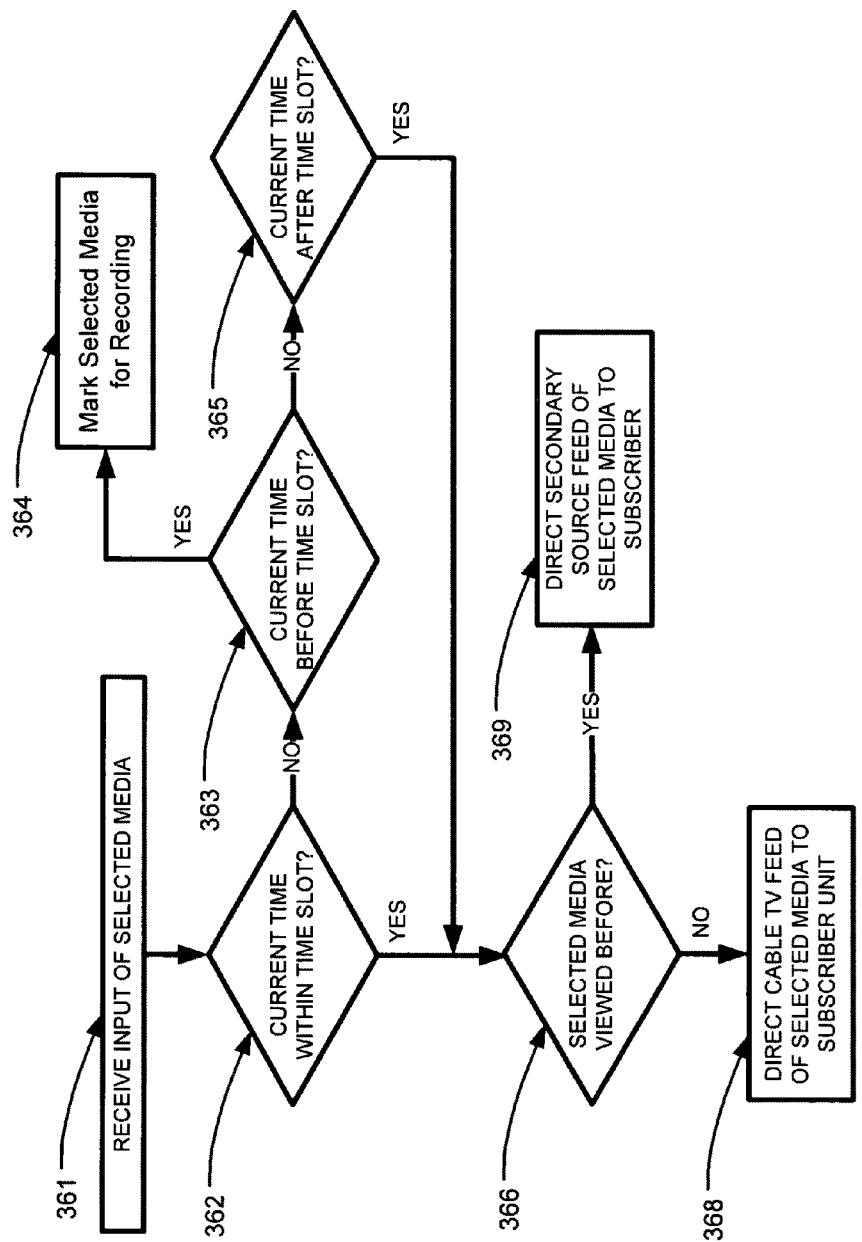
FIG. 3C is a flowchart generally depicting a process of one embodiment of the present invention.
Figure 3D:
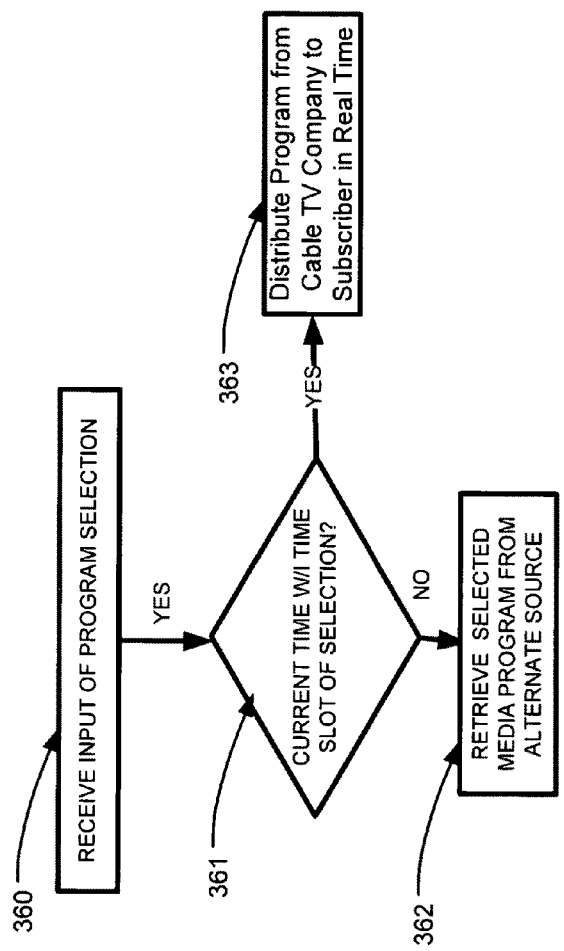
FIG. 3D is a flowchart generally depicting a process of one embodiment of the present invention.

With reference to the flowchart of FIG. 3D, the function of a further embodiment of the invention is generally summarized. By using an associated keypad or remote control device (not shown), a user may "navigate" a cursor or other graphical indicia 335 to a displayed program title 336 (not shown) or time slot 333 to select the programming scheduled for viewing at that time slot 333. Once selected, the subscriber unit 202 may be configured to receive the input of the selected program (360). A determination is then made as to whether or not the then current time falls within the time slot scheduled for showing of the selected Program (361) from a first source. If not, the selected media program will be retrieved from an alternate source (362). Otherwise the selected media will be distributed from a cable TV provider (363).

Figure 3E:
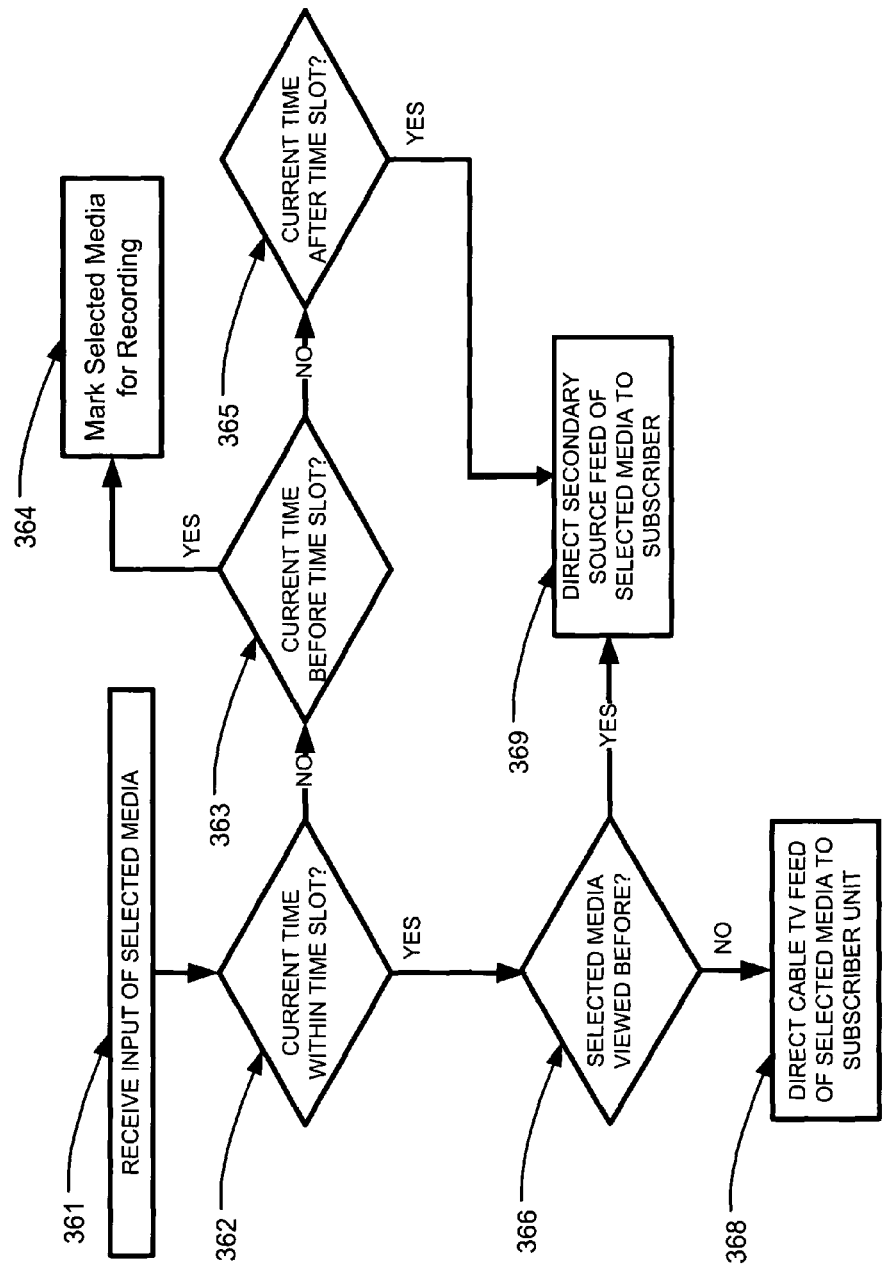
FIG. 3E is a flowchart generally depicting a process of one embodiment of the present invention.

With reference to the flowchart of FIG. 3C, the function of a further embodiment of the invention is generally summarized. By using an associated keypad or remote control device (Not Shown), a user may "navigate" a cursor or other graphical indicia to a displayed program title 335 or time slot 333 to select the programming scheduled for viewing at that time slot 333. Once selected, the subscriber unit 202 may be configured to receive the input of the selected program (361). A determination is then made as to whether or not the then current time falls within the time slot scheduled for showing of the selected program (362). If not, it may then be determined whether or not the current time is before the time slot scheduled for showing of the selected program (363). If the then current time is before the scheduled time slot, the program selection may be "marked" for "recording" once the selected program is distributed/shown at the scheduled future time slot (364). If the then current time is within the scheduled time slot (362) then a determination is made as to whether or not the selected program has previously been viewed/accessed/retrieved/distributed to the subscriber unit 202 before (366). This determination may be made by the subscriber unit 202 based on metrics collected and stored by the subscriber unit 202. Alternatively, it may be made based upon information collected and/or stored on source control 250. If the media has not been viewed before, then the direct cable TV video feed of the selected program will be directed via the subscriber unit 200 to an associated display 113 for viewing (368). If it has been viewed before, then an alternate source (275, 276, 277) where the selected media will be accessed/retrieved from and directed via the subscriber unit 202 to an associated display for viewing (369). If the then current time falls after the scheduled time slot of the selected program, then an alternate source (275, 276, 277) where the selected media will be accessed/retrieved from and directed via the subscriber unit 202 to an associated display for viewing (369) (see FIG. 3E). In this embodiment, once the original/first showing (distribution) of a program is made it is preferably concurrently or subsequently stored to a media library 402.

In a further embodiment, a source control unit 250 may be provided. The source control may be configured to collect relevant data concerning subscribers, advertising, programming sources, alternate sources, programming scheduling and/or broadcasting/distribution history etc, and to transmit control signals and/or data to subscriber unit 202 and/or distribution and control 107 that may be necessary for accurate selection and distribution of video programming, and/or other copyrightable material, via the subscriber unit 202 for viewing on an associated display device 113. The source control 250 may be provided and configured to keep track of subscriber usage and viewing metrics as determined/collected by the subscriber unit 202 based upon user input via control keys/keypad and/or cursor or joystick devices. Further, the source control 250 may be configured to communicate with the subscriber unit 202 via, for example, the Internet or a closed network system/connection.

In one embodiment the source control unit 250 may be configured to allow for advertisers, content source owners/operators and/or content/owners or producers to input data to identify a source for an identified program/media content, the location (i.e. URL) of the content scheduled to be distributed, as well as define the desired parameters by which a given program/media content will be retrieved/accessed and distributed from an identified source.

The identity of programming sources and/or related universal resource locator (URL) information for each program selection identified via user interaction with the programming guide (130), may be collected and stored, for example, by a source control server 255 (FIG. 2B) on memory storage device(s) associated with the source control server 255. In addition, rules for determining source selection can be maintained on the source control server 255. Data representing the identity and/or URL associated with given media sources may also be transferred to the subscriber unit 202 where such data may be stored in storage memory associated with the subscriber unit 202 until it is updated or operations requiring the data are completed.

The source control 255 may also be configured to carry out the functionality required to make the determinations associated with selecting a media source described above in connection with embodiments of a subscriber unit 202. Alternatively, the functionality of the source control server may be incorporated into and/or carried out by the subscriber unit 202, either in whole or in part.

The owners/operators of each media source (alternate media source, media library 402, etc.) 275 will typically place advertising of advertisers who have paid the media source owner for such advertising exposure. In return the media source owners/operators are paid a fee for such advertising. Typically, advertising rates are greater when the number of people seeing the advertising is greater. In such a case the advertising rates charged for advertising could be adjusted (up or down) based upon measured/detected actions of the subscriber, such as clicks on an advertisers web site, hovering over a display advertisement/storefront, placing a call to an advertisers phone number and/or responding to coupons issued in connection with an associated advertisement, which indicate a positive response to the advertising. With the proposed system and method, it is possible for media source owners/operators to choose what level of exposure they desire to have for advertising placed in programming hosted on their media servers, by establishing/choosing certain criteria by which a subscriber unit 202 will access/retrieve programming from available media servers (after a subscriber has made a program selection via the subscriber unit 202). This selection/choice process can take place in conjunction with the owners/operators of source control 255 since they have access and control over the criteria and user metrics relevant to how each subscriber unit 202 will select/access/retrieve a program selection for subscriber viewing. Advertising provided to a given subscriber during a given video program may be tailored to match the interests of the subscriber based upon behavioral data collected via the subscriber's interaction with the subscriber unit 202 and/or data collected from the user when establishing service. For example, the subscriber unit 202 may be configured to monitor what categories and/or storefronts within the programming guide 350 a user visits and whether or not the user clicks thru to any links associated with storefronts within the programming guide 350, engages any adver-games associated storefront, submits comments concerning products associated with a storefront, as well as how many times such activities take place. Further, any purchases made via the programming guide may also be noted.

In one embodiment a media library 402 (FIG. 2B) is provided and associated with the cable TV distributor 106. This media library 402 includes one or more storage devices configured to receive and store electronic format copies of programming that has been distributed via the cable TV system during a time slot that has already passed. This media library may be owned and controlled by the cable TV distributor or, alternatively by another party having no relation to the cable TV distributor.

Storefront

Figure 4A:
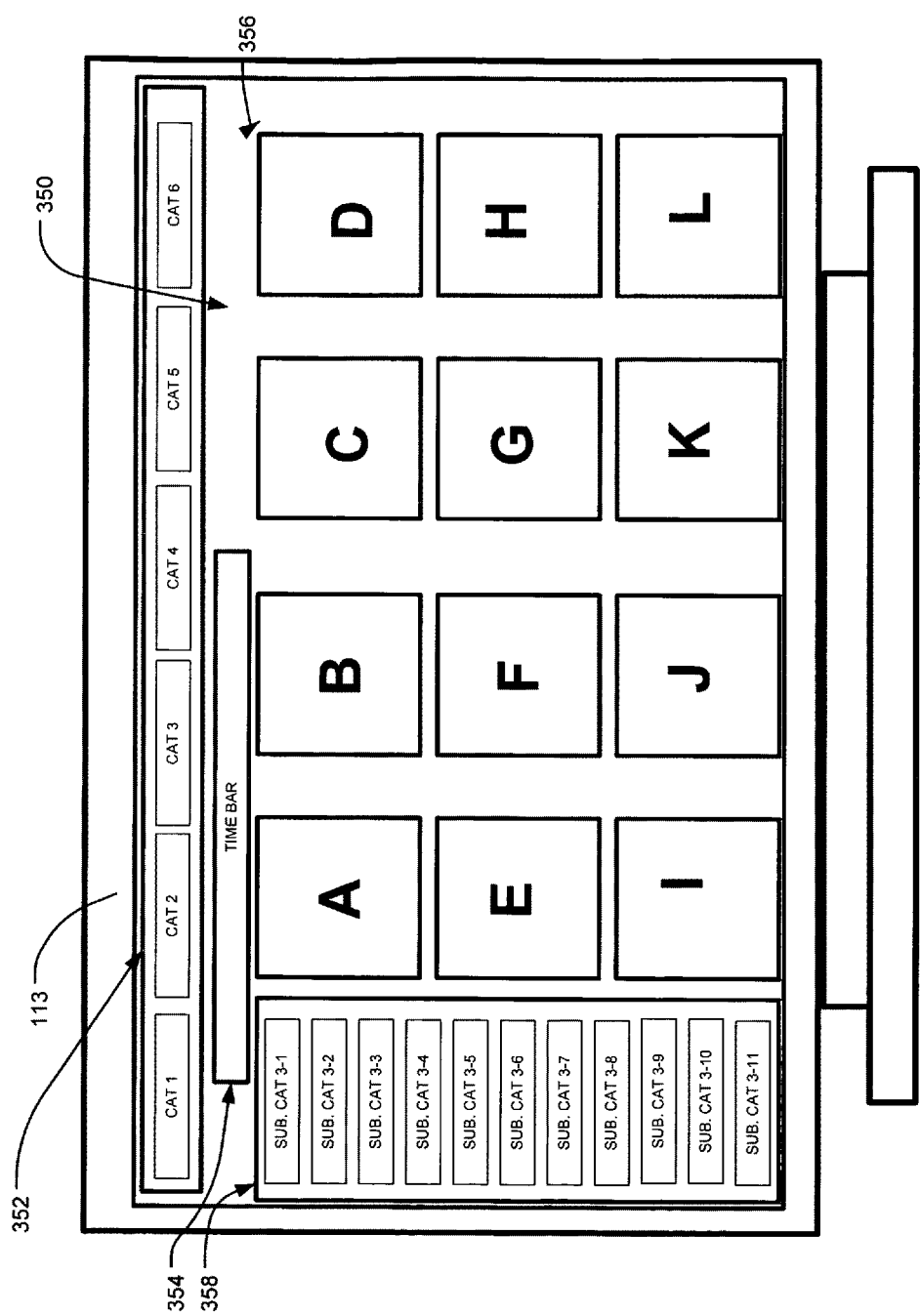
FIG. 4A is a diagram of a diagram generally depicting an example of one embodiment of a programming guide 350 provided to subscribers via a subscriber unit 202 in which interactive storefronts associated with a particular video program or media content are displayed.

FIG. 4A and FIG. 4B are diagrams generally depicting a further embodiment of a programming guide 350 according to the invention. In this embodiment, the subscriber unit 202 is configured to cause a programming guide 350 to be displayed on an associated display device 113. More particularly, a programming guide is provided in which multiple "storefronts" A-L are displayed within a storefront section window 356 of the programming guide 350. Each storefront A-L may be associated with, for example, but not limited to, a particular broadcaster, channel, video program, movie, television series, sports team, college, city event, organization, web site or selection of media content. Additionally, storefronts may be associated with and provided for other media content, such as advertising, news sources, personal contact information or calendar, or e-mail address, messaging service, widget applications, software applications, data file and/or classified.

Storefronts A-L are preferably interactive and allow a user to navigate to each storefront A-L to obtain further details that become visible when the user navigates a cursor or other indicia to/over the storefront. The storefronts are also preferably linked (hyper-linked) to one or more predetermined sources for video programming represented by the storefront. By activating the hyper-link, it is possible to access video programming and have it displayed via the subscriber box on an associated display device 113. A first section of categories 352 is provided. A subcategory section 358 is also provided. An interactive navigable time bar 354 is provided and may be configured to allow a subscriber to navigate thru not only current time slots and future time slots, but also past time slots.

Depending on which category icon/control button (420-424) is selected from the category section 352, a set of one or more subcategories may be displayed in the subcategory section 358. As an example, and with further reference to FIG. 4D, if a subscriber were to select, for example, "Cat 1" 421, a series of interactive icons/control buttons for subcategories 441-451 would be displayed within the subcategory section 358. A subscriber may then select from one of the subcategories 441-451 that are displayed by clicking on one of the interactive icons/control buttons associated with the subcategory of interest. Each category may include one or more subcategories as may be desired or required.

FIG. 4B shows further details of a possible implementation of the category section 352. In this embodiment five active icons/buttons 420-424 are provided for five separate predefined categories of programming/content/information.

FIG. 4C is a diagram generally depicting a possible implementation of navigable time bar 354. The navigable time bar 354 is preferably configured to provide a subscriber with an interface for interactively navigating backwards or forwards through past, present and future time slot scheduling of programming. Depending on the time range shown, storefronts relevant to the range of time/time slots within the time frame shown as current on the navigable time bar 354 will be shown. This time bar 354 may be configured to display a range of time slots 430-436 as well as interactive navigation controls 415 and 416. The interactive navigation controls 415 and 416 are preferably configured to allow a user to move/navigate the range of time slots visible in the time bar either backward or forward. The navigation controls 415 and 416 may be activated via navigation of a cursor (not shown) pursuant to subscriber input with a keypad, remote control, joystick or other suitable input device associated with the subscriber unit 202. In this example the interactive navigation control 415 is configured to allow a subscriber to move the range of time slots visible in the time bar backward while the interactive navigation control 416 is configured to allow a subscriber to move the range of time slots visible in the time bar forward.

In a preferred embodiment, the navigable time bar is configured to allow a subscriber to navigate to time slots that have already elapsed to thereby display storefronts relevant to programming that may have been distributed via, for example, the cable TV distributor 106 at a time slot that has already elapsed. In a further embodiment the navigable time bar is also configured to allow a subscriber to navigate to time slots in the future. Storefronts can be provided in future timeslots and configured to allow a user to access information concerning upcoming scheduled programming. Information such as programming trailers or episode excerpts are examples of the type of information/content that could be accessed via a storefront at a time that is prior to the schedule time of a given program/content. Once the scheduled time slot arrives, the storefront will then be activated to provide the user access to the associated scheduled content/programming. A user may navigate to a future time slot to view storefronts associated with scheduled content to be accessible for viewing at the given time. This may be accomplished by navigating to a time slot via the navigable time bar 354 and then accessing available information by "clicking" thru the storefront/hyperlink.

The storefront window section 356 represents a time slot as defined by the navigable time bar 354. Any storefront located within the storefront window 356 represents video programming or other media content that is scheduled for showing/distribution/availability during the time slot indicated by the time bar 354. For example, where the time bar 354 indicates a time slot of 1:00 PM-1:30 PM, any storefront within the storefront window 356 will represent or otherwise be associated with video programming or other copyrightable content that is available during the 1:00 PM-1:30 PM time slot indicated by the time bar 354.

The storefront window 356 may include one or more storefronts. Each storefront within the space defined by the storefront window 356 may represent video programming or other media content that is scheduled for a particular time slot as indicated by the time bar 354. In a preferred embodiment, the time bar 354 is navigable and configured to allow a user to navigate the indicated time in the time bar 354 backward in time to view storefronts for scheduled programming/content that has previously been delivered at a scheduled time slot in the past.

Each storefront (A-L) may be, for example, associated with a particular video program, web based media content, streaming (audio and/or video) content or other copyrightable subject matter. The storefront may also be, for example, associated with a particular video program, streaming (audio and/or video) content, web site publisher or content provider or source. Further, the storefront may be actively linked to a source for a stream of video programming, web based media content or other copyrightable subject matter.

Figure 4E:
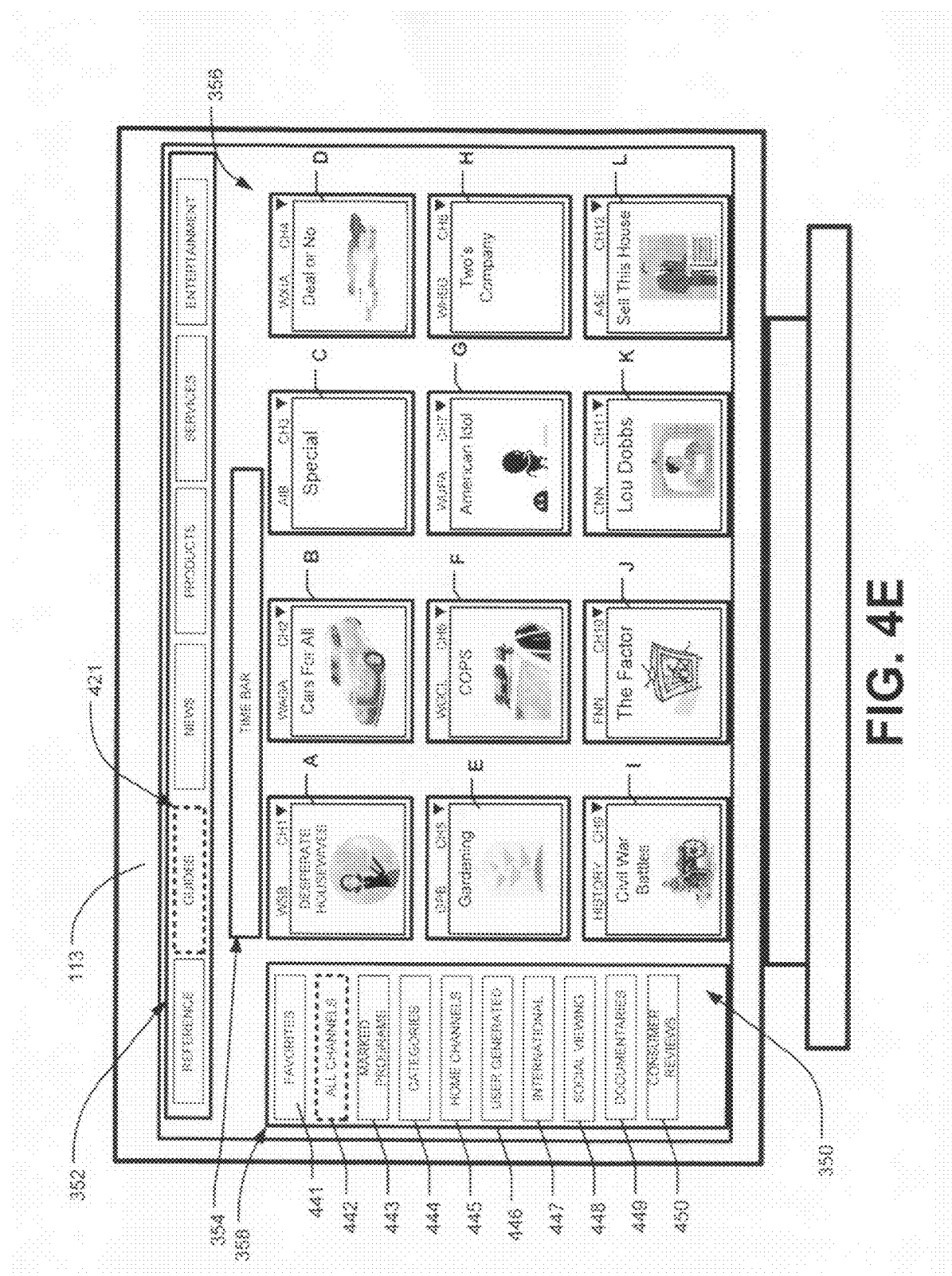
FIG. 4E is a diagram generally depicting an example of one embodiment of a programming guide 350 in which interactive storefronts are provided.

With reference to FIG. 4E further details of a possible implementation of programming guide 350 are depicted. In this example, the category "GUIDES" 421 has been selected and clicked using a keypad, remote control, joystick or other suitable input device associated with the subscriber unit 202. As a result, the subcategories 441-450 that are associated with the category "GUIDES" 421 are displayed within the sub category section 358. These subcategories are, for example, "FAVORITES" 441, "ALL CHANNELS" 442, "MARKED PROGRAMS" 443, CATEGORIES" 444, HOME CHANNELS" 445, "USER GENERATED" 446, "INTERNATIONAL" 447, "SOCIAL VIEWING" 448, DOCUMENTARIES" 449 and "CONSUMER REVIEWS" 450.

In one embodiment, the storefront A is interactive and may be configured to cause the subscriber unit 202 to tune to the identified channel 461 when a subscriber activates the storefront A by, for example, clicking on the window 490 of storefront A with a cursor or other pointer (not shown) controlled by subscriber input 202 made via, for example a keypad, remote control or other control device associated with the subscriber unit 202.

Figure 1A:
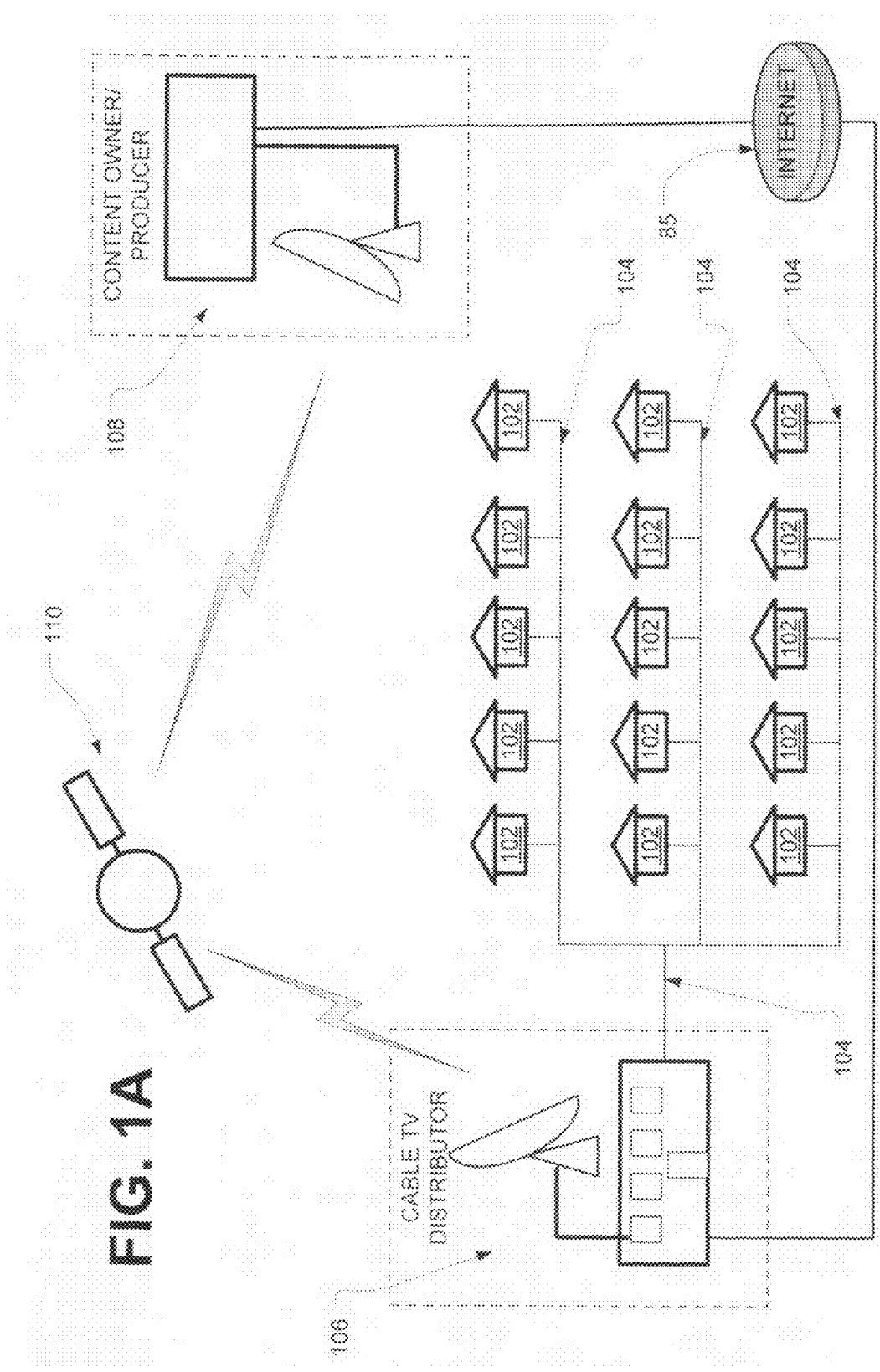
FIG. 1A is a diagram generally depicting a typical cable television distribution system.
Figure 1D:
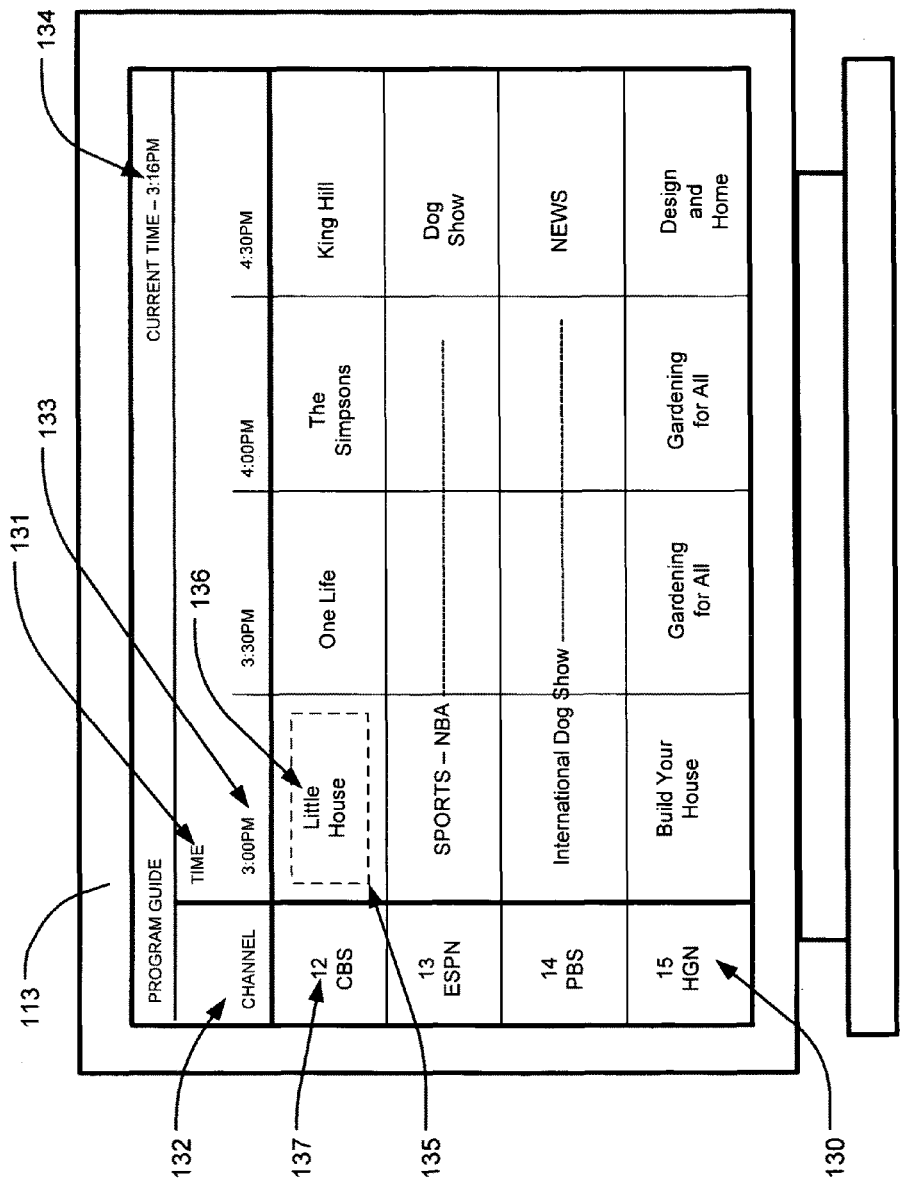
FIG. 1D is a diagram generally depicting an example of a typical programming guide provided to subscribers of a typical cable TV system.

FIG. 4F1 generally depicts one possible embodiment of a storefront A. In this embodiment, a storefront window 459 is provided. The storefront A may include a source identification section 460 for identification of the broadcaster, cable provider or other source of programming or other copyrightable material and channel identification section 461 for identification of the cable TV channel via which programming is provided. An information section 458 may be provided and may include programming title information 462 for programming being provided during the current time slot. The information section 458 may also include, for example, graphics, such as, for example logos or advertising, 463 that are, for example, associated with the identified broadcaster/provider 461 or the programming identified by the title 462. The information section 458 may include static graphics and/or full motion video of programming being broadcast/provided on the identified channel 461 during the current time slot could be shown within the storefront window 459 of the storefront A. The storefront may be associated with a signal (digital or analog) incorporated into predetermined programming/media content, for example movie or TV programming. When the associated movie/media content is displayed on an associated display device or otherwise received via a subscriber unit, the signal incorporated into the predetermined programming/media content may be used as a "trigger" to cause the storefront to appear and be visible on top of or adjacent to the programming/media content being displayed on the associated display device. This digital signal may also be used as a trigger to change, for example, the size or the location of the storefront on the associated display device.

A control drop down button 464 (see FIG. 4F1) may be provided to give a user/subscriber access to additional control functions via a control drop down 465 (see FIG. 4F2 and FIG. 4G). In the example, shown in FIG. 4F2 and FIG. 4G, the control drop down 465 is configured to provide control buttons for adding a replica of the storefront A to the marked programs sub-category (443) 465A, adding a replica of the storefront A to a FAVORITES category (441) 465B, customizing the position of storefront A within the storefront window 356 (465C) and/or other options (465D) as may be provided for. The control drop down button 464 may be configured to provide a user/subscriber the ability to extract the storefront to make it appear on top of other content being displayed on the associated display device, similar to the way the hover over may be extracted as discussed further herein. The control drop down button 464 may also provide a user/subscriber the ability to change the size and location of the storefront as it appear on top of other content being displayed on the associated display device.

Marked Programming

As a convenience for a subscriber/user, the subscriber unit 202 may be configured to allow a subscriber to "mark" a program shown by the programming guide 350 as being scheduled to be distributed/shown via the cable TV distributor during a predetermined future time slot in the future, as a program that they would like to remember to view. In a preferred implementation, a program may be marked by sending a replica of the storefront associated with the program of interest to a "marked programs" sub-category 443 (see FIG. 4E). A program could be "marked" by using appropriate controls from the control drop down 465 (FIG. 4F2 and FIG. 4G) of the storefront, in this case storefront A. With reference to FIG. 4F2 and FIG. 4G, by selecting, for example, the "send to marked" control button 465A, the set top box 202 would cause a replica of the storefront A to be added to the "MARKED PROGRAMS" sub category 443 (FIG. 4E) where it would be consolidated with replicas of other storefronts associated with other programs/content that have previously been "marked" by the subscriber/user. By consolidating the storefront replicas for marked programs to a single category, a user/subscriber may more easily remember, find and access the programming/content that they are interested in at a later time.

The controls for allowing a user to send a program to the "marked programs" sub-category may be accessed, for example, via the storefront control panel 465 which is accessible via control drop down button 464 (FIG. 4F1). Upon marking of the program, a replica of the storefront associated with the marked program is created in, for example, the "marked programs" sub-category 443 of the programming guide 350 (see FIG. 4E).

By consolidating in a single category, replicas of storefronts that are associated with programming that a subscriber/user has previously identified (via marking the storefront) as being of interested, it is easier for the subscriber user to subsequently remember, find and access those programs that they are interested in watching without requiring them to search the programming guide 350 again.

Figure 4H:
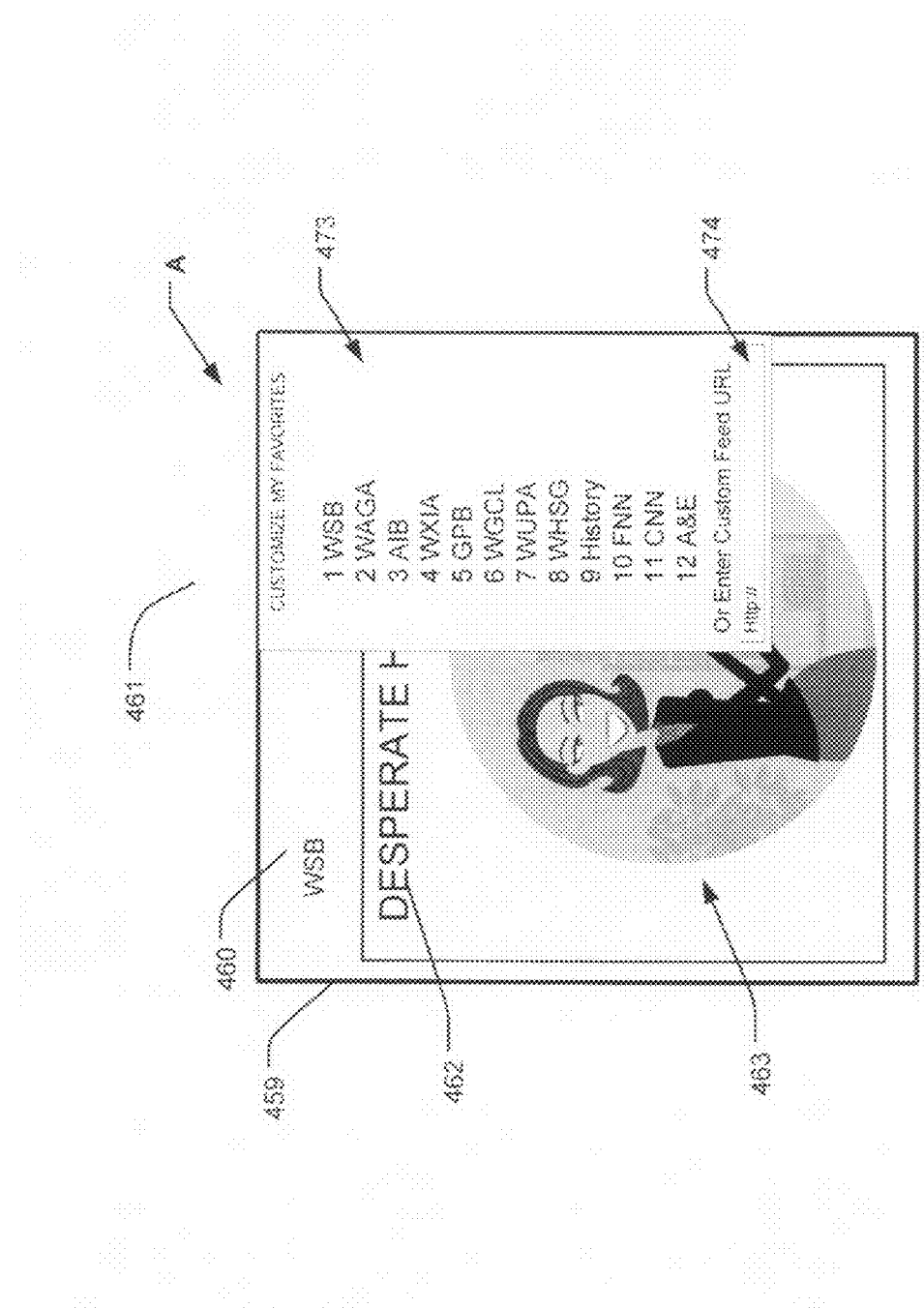
FIG. 4H is a diagram generally depicting additional details of one embodiment of a hover-over 490.

FIG. 4H is a diagram generally depicting a customization control drop down 473 that may be accessed via clicking the CUSTOMIZE control button 465C of the control drop down 465 of the storefront A. The customization control drop down 473 is provided to allow a user to arrange the position of storefronts within the storefront section 356. Using this control system a user may place storefronts in any desired order within the storefront window 356. In addition, the customization control drop down may include a custom URL input field 474 for entering a URL for a web page or other web based information. By entering a custom URL, a generic icon would be added to the storefront window 356 and provide a hyper link to the identified URL.

Hover-Over

Figure 4I:
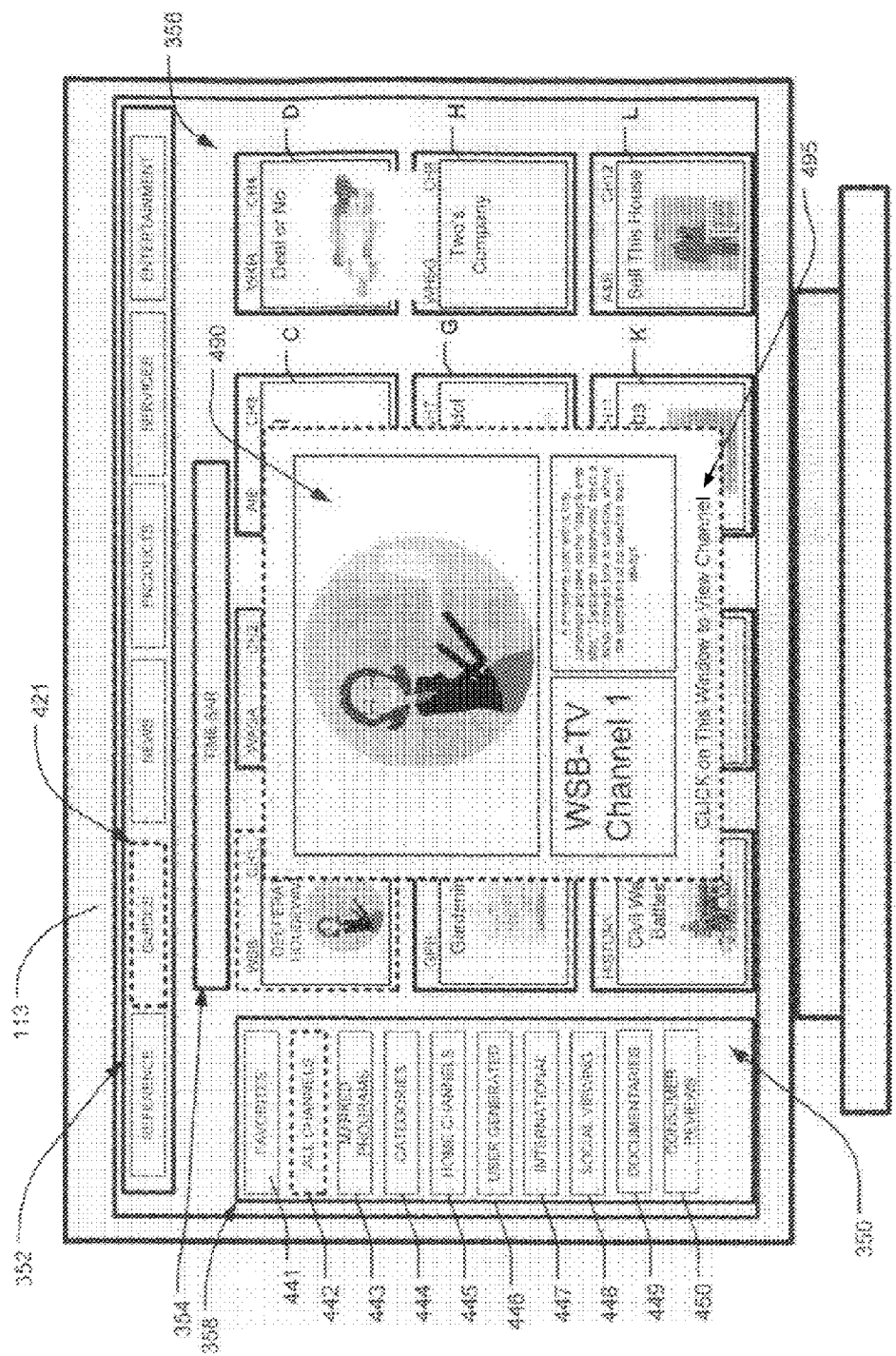
FIG. 4I is a diagram generally depicting a further embodiment of a programming guide 350 in which interactive storefronts P-U are provided in association with predetermined product information.

In a further embodiment, generally depicted in the illustration set out in FIG. 4I a storefront, such as storefront A, may be configured to provide a subscriber with additional information or choices for selection via a hover-over window 490. A storefront may be configured to have a first state of operation, in which the storefront is active and may be, for example, interacted with via, for example, "clicking" on it, to initiate delivery of copyrightable subject matter, such as, for example, video programming or other media content associated with or linked to the storefront. The storefront may also have a second state of operation in which a hover over window 490 becomes viewable in front of the storefront upon movement of a control cursor/pointer over the storefront. The hover over window may place into view for the user an area in which links to associated programming or media content, advertising, control buttons, input keys, as well as displays of graphics, full motion video or textual information related to the storefront may be present for viewing and access by a user.

The hover over window 490 becomes visible in front of the storefront A when a subscriber passes a cursor or other pointer (not shown) controlled by subscriber input made via, for example a keypad, remote control or other control device associated with the subscriber unit 202 over the storefront A.

Figure 4J:
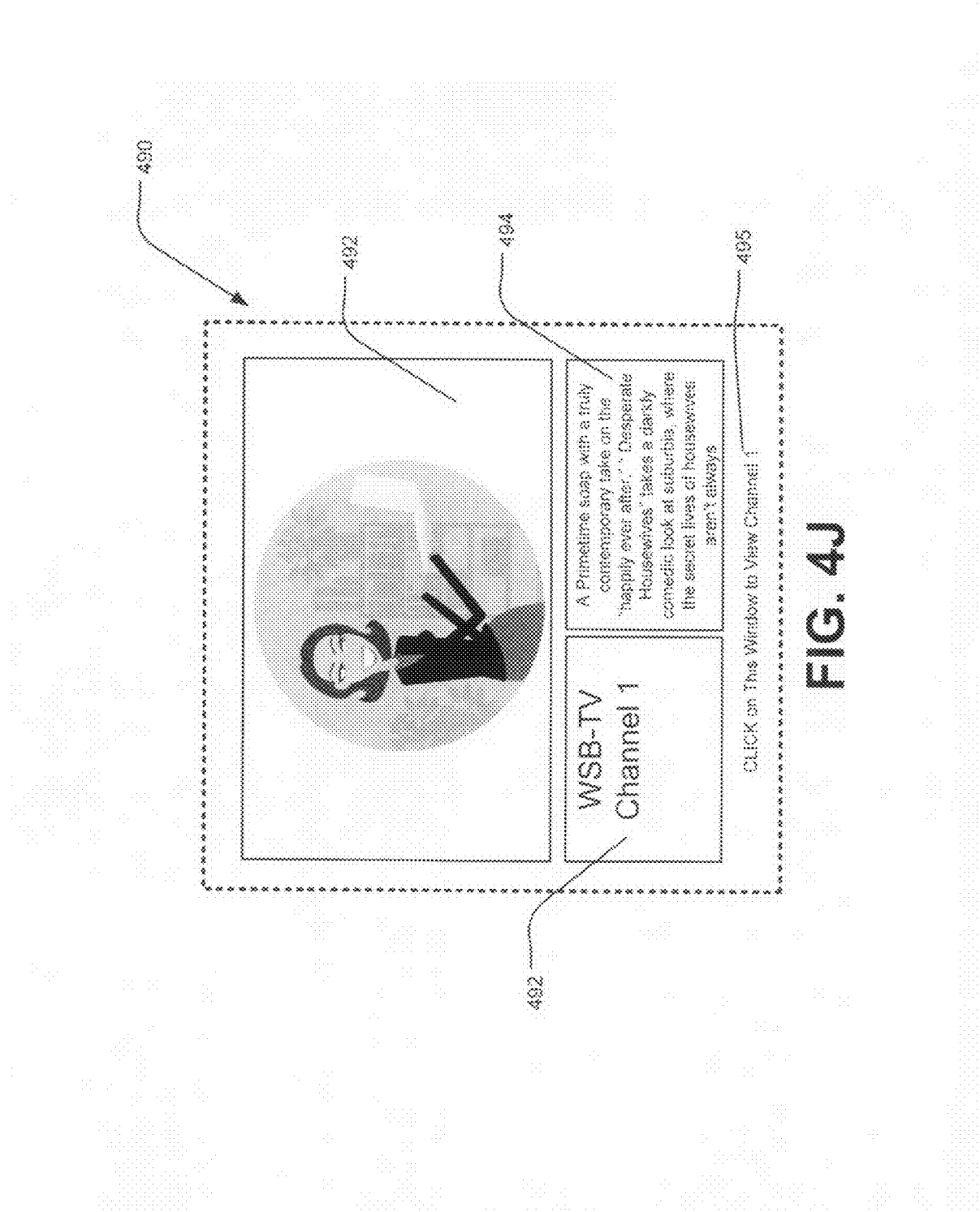
FIG. 4J is a diagram generally depicting details of an embodiment of an interactive storefront P that is provided in association with a predetermined product or advertiser.

In one embodiment, the hover over window 490 may be configured as generally depicted in FIG. 4J. With reference to FIG. 4J the hover over window 490 may be configured to include an advertisement section 492, advertiser/broadcaster identification section 493 and information section 494 for providing details of the item or program set out in the advertisement section 492 or the advertiser or broadcaster identified in identification section 493. Information set out in the advertisement section could include, for example, full motion video of the television program currently being broadcast on the channel identified in identification section 493. A hyper-link ("link") 495 may be included to allow a subscriber to access, for example, the television programming broadcast identifier section 493.

Figure 4K:
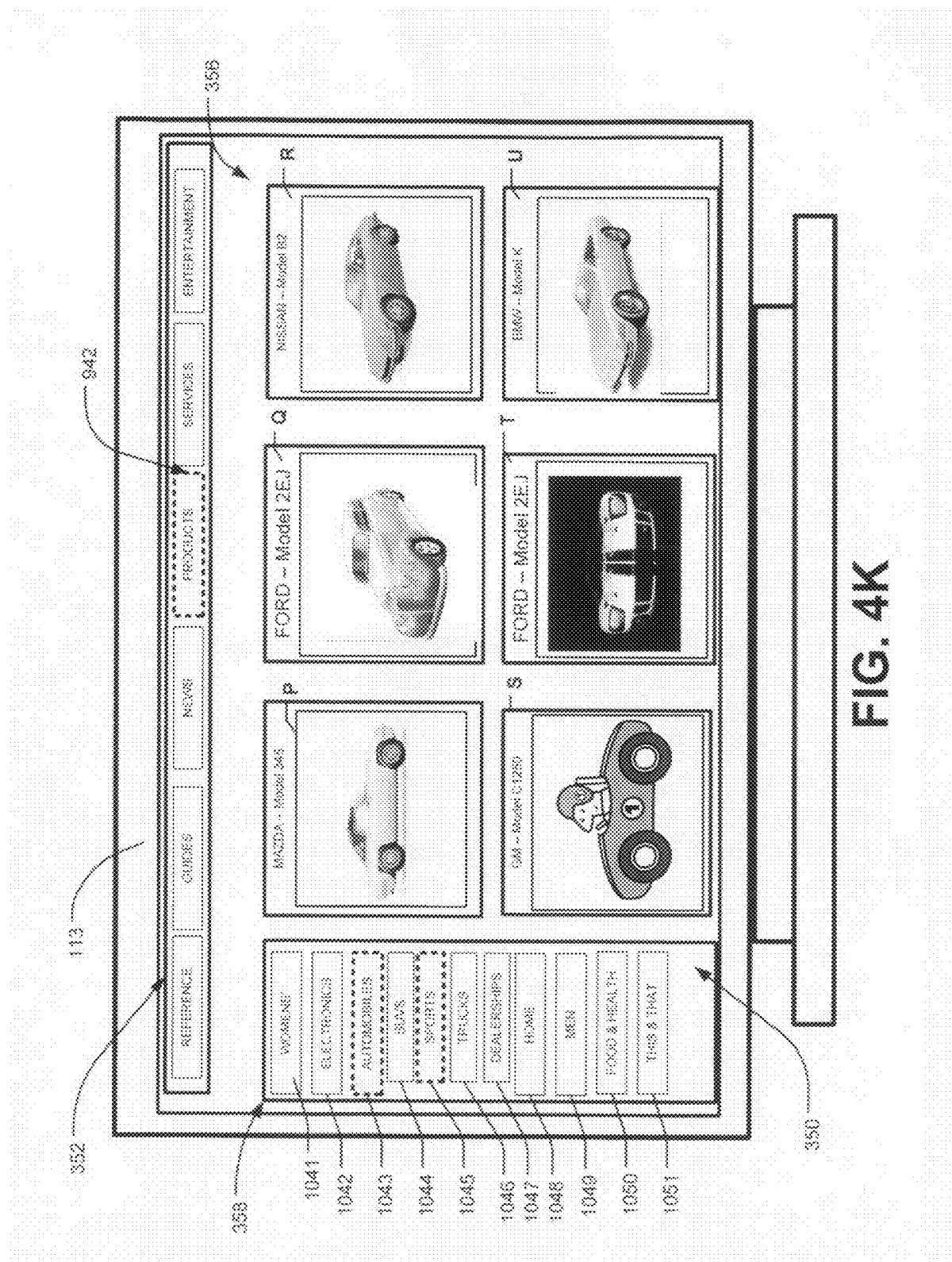
FIG. 4K is a diagram generally depicting an example of one embodiment of a hover-over window 1090 associated with an interactive storefront P.

With reference to FIG. 4K details of a further possible implementation of programming guide 350 are depicted. In this embodiment, the programming guide 350 is configured to provide a user the ability to access and retrieve information about/concerning one or more products represented by storefronts P, Q, R, S, T and U. In this example, the category "PRODUCTS" 942 has been selected and clicked using a keypad, remote control, joystick or other suitable input device associated with the subscriber unit 202. As a result, the subcategories 1041-1051 that are associated with the category "PRODUCTS" 942 are displayed within the sub category section 358. These subcategories are, for example, "WOMENS" 1041, "ELECTRONICS" 1042, "AUTOMOBILES" 1043, "SUVS" 1044, "SPORTS" 1045, "TRUCKS" 1046, "DEALERSHIPS" 1047, "HOME" 1048, "MEN" 1049, "FOOD & HEALTH" 1050 and "THIS & THAT" 1051. The subcategory AUTOMOBILES 1043 has been selected and the subcategory "SPORTS" 1045 of the subcategory AUTOMOBILES 1043 has been selected thus revealing the storefronts P, Q, R, S, T and U which are related to products within the SPORTS car category 1045.

FIG. 4L generally depicts a further embodiment of a storefront P. In this embodiment, a storefront window 1059 is provided. The storefront P may include identification of the manufacturer or seller 1060 of the advertised product, and/or identification of the advertised product 1062. Additionally, graphics, such as, for example logos, photographs and/or advertising 1063 may be provided as well as, identification of the advertisement 1061. Alternatively, instead of static graphics, full motion video of advertising related to the advertised product may be shown within the window 1059 of the storefront P.

Figure 4M:
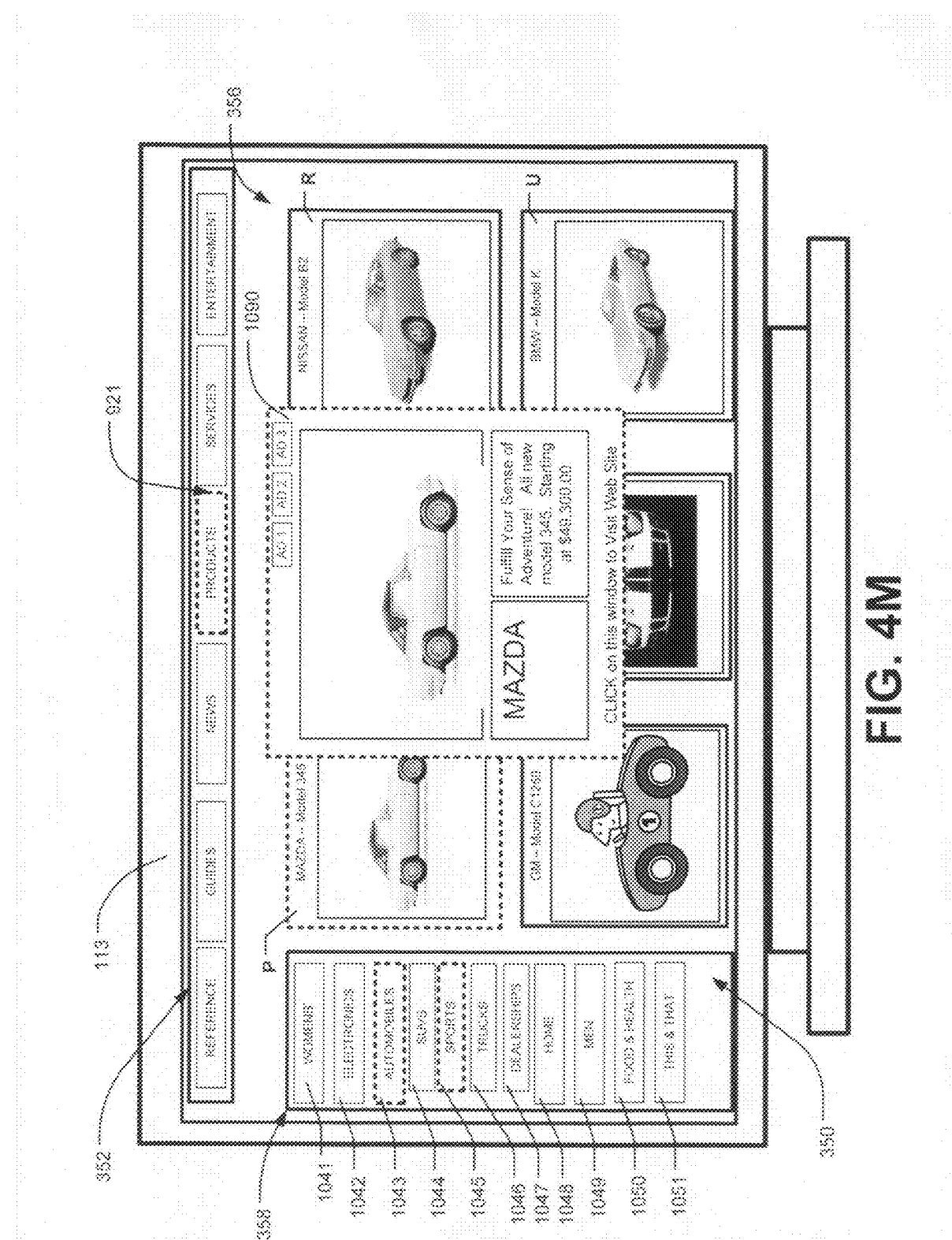
FIG. 4M is a diagram generally depicting an example of a programming guide 350 in which interactive storefronts PP, QQ, RR, SS, TT and UU are provided in association with predetermined news sources.

With reference to FIG. 4M the storefront P is preferably interactive and configured to cause the subscriber unit 202 to retrieve/access information, published at a predetermined URL, concerning an advertised product 1062 for display on an associated display device 113, when a subscriber activates the storefront P by, for example, clicking on the storefront P with a cursor or other pointer (not shown) controlled by subscriber input made via, for example a keypad, remote control or other control device associated with the subscriber unit 202.

The storefront P may be configured to provide a subscriber with additional information or choices for selection via a hover-over window 1090 that becomes visible in front of the storefront P when a subscriber passes a cursor or other pointer (not shown) controlled by subscriber input made via, for example a keypad, remote control or other control device associated with the subscriber unit 202 over the storefront P.

Figure 4N:
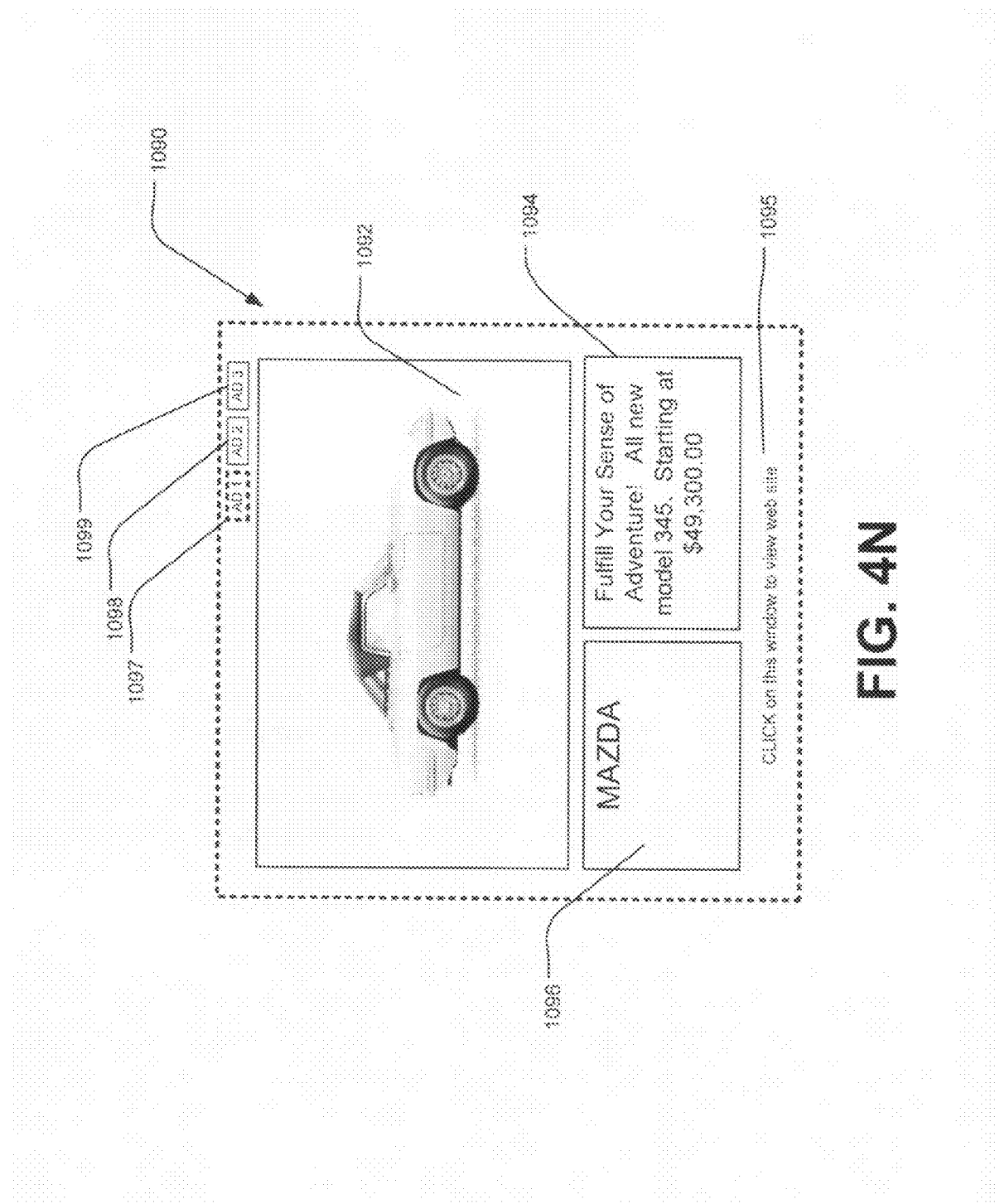
FIG. 4N is a diagram depicting details of an embodiment of an interactive storefront QQ that is provided in association with a predetermined news source 1160.
Figure 40:
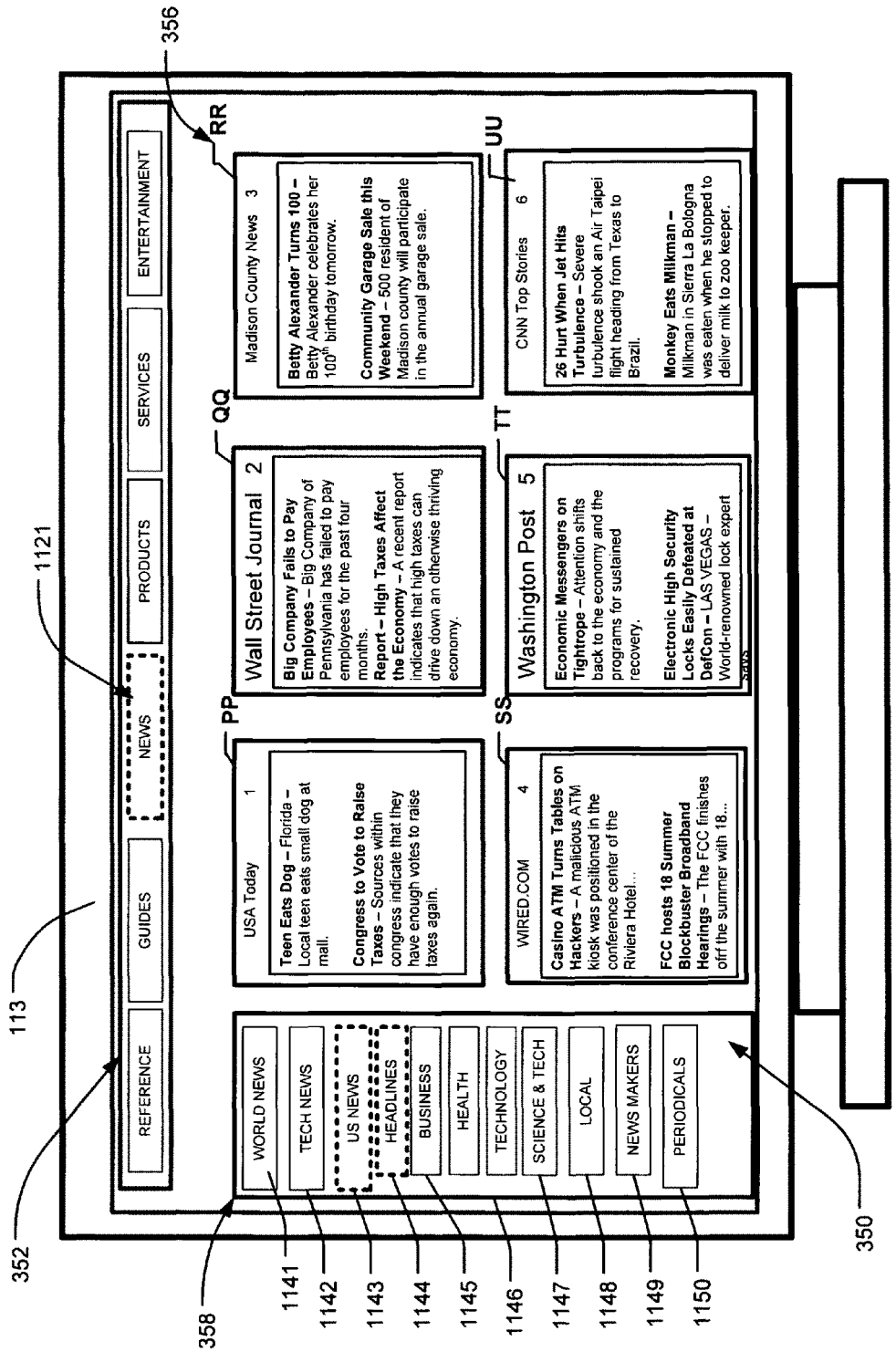

In one embodiment, the hover over window 1090 may be configured as generally depicted in FIG. 4N. With reference to FIG. 4N the hover over window 1090 may be configured to include an advertisement section 1092, manufacturer or seller identification section 1096 and information section 1094 for providing details of the item set out in the advertisement section 1092 or the manufacturer or seller identified in seller identification section 1096. Information set out in the advertisement section 1092 could include full motion video of advertising related to the product identified in seller identification section 1096. Advertising Preference Controls 1097, 1098 and 1099 may be provided to allow a user to choose one of several options for display of information and/or advertising to appear in the advertising and/or information section 1092 and/or 1094. In this example, the option 1097 has been selected. The hover over window 1090 may be configured to include a hyper link (link) 1095 by which a subscriber may access, for example, a web-page associated with the product or seller to which the storefront P is associated. By allowing a subscriber to preview information concerning the product or seller associated with the storefront P without automatically retrieving the sellers web page, it is possible to minimize the number of click thru to the web page that are made by people with no real interest in the product/seller.

In a further embodiment, the hover over window 1090 may be configured to provide a user with tools or interfaces for applications, such as, for example, "adver games" which provide a subscriber with access to a software based "adver-game" application that is displayed and accessible within the hover over window 1090. The adver game application may include visual content that relates to or is otherwise descriptive of the product or seller to which the storefront to which the hover over window is associated.

The hover over window 1090 may be configured to provide visual indicators or displays of data collected by the system, such as, for example, user metric or targeting data. This data may be presented via the hover over window 1090 as, for example, a numeric value or as a star rating indicator to indicate, for example such things a user favorability ratings for subject matter to which the hover-over window 1090 or storefront is related.

With reference to FIG. 4O details of a further possible implementation of programming guide 350 are depicted. In this embodiment, the programming guide 350 is configured to provide a user the ability to access and retrieve news information from one or more sources represented by stored fronts PP, QQ, RR, SS, TT and UU. In this example, the category "NEWS" 1121 has been selected and clicked using a keypad, remote control, joystick or other suitable input device associated with the subscriber unit 202. As a result, the subcategories 1141-1151 that are associated with the category "NEWS" 1021 are displayed within the sub category section 358. These subcategories are, for example, "WORLD NEWS" 1141, "TECH NEWS" 1142, "US NEWS" 1143, "HEADLINES" 1144, "BUSINESS" 1145, "TECHNOLOGY" 1146, "SCIENCE & TECHNOLOGY" 1147, "LOCAL" 1148, "NEWS MAKERS" 1149 and "PERIODICALS" 1150. In this example, the subcategory "US NEWS" 1143 has been selected and the subcategory "HEADLINES" 1145 of the subcategory "US NEWS" 1143 has been selected thus revealing the storefronts PP, QQ, RR, SS, TT and UU which are related to news within the HEADLINES news category 1145.

Figure 4P:
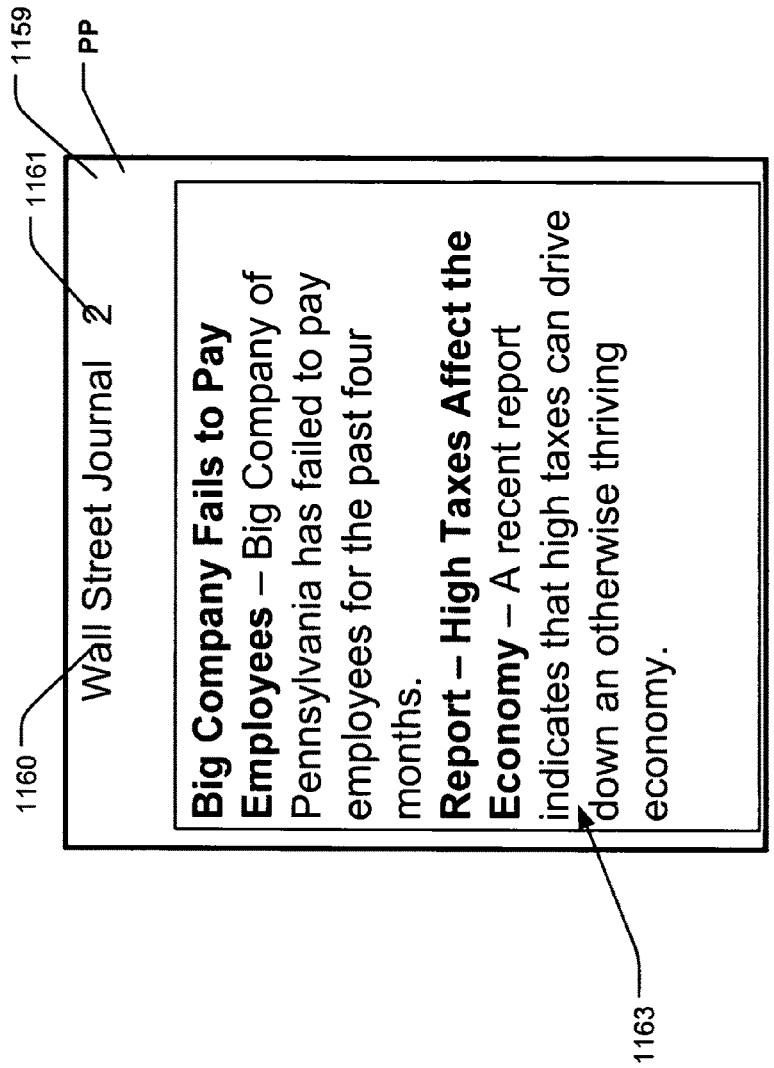
FIGS. 4P-4R are diagrams generally depicting additional details of one embodiment of a over-hover 1190 configured to provide a magnified view of news content generally depicted via a storefront QQ.
Figure 4Q:
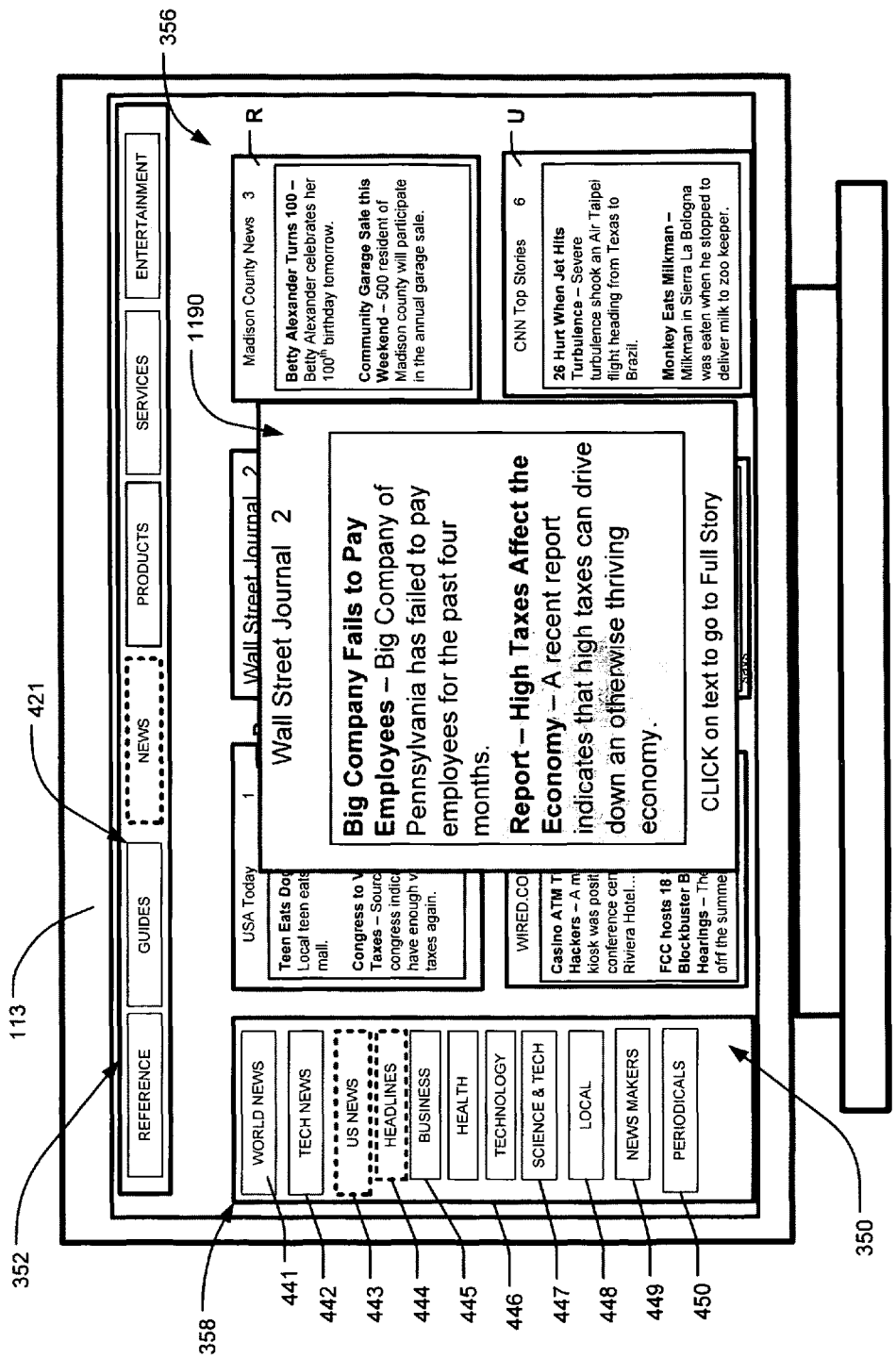

FIG. 4P generally depicts an example of a storefront PP. In this embodiment, a storefront window 1159 is provided. The storefront PP may include identification of the news source 1160 of the news content 1163. Additionally, identification 1161 of the news source 1160 may be provided. With reference to FIG. 4Q the storefront PP is preferably interactive and configured to cause the subscriber unit 202 to retrieve/access information, published at a predetermined URL, concerning an advertised product 1062 for display on an associated display device 113, when a subscriber activates the storefront PP by, for example, clicking on the storefront PP with a cursor or other pointer (not shown) controlled by subscriber input made via, for example a keypad, remote control or other control device associated with the subscriber unit 202. The storefront PP may be configured to provide a subscriber with additional information or choices for selection via a hover-over window 1190 that becomes visible in front of the storefront PP when a subscriber passes a cursor or other pointer (465) controlled by subscriber input made via, for example a keypad, remote control or other control device associated with the subscriber unit 202 over the storefront PP.

Figure 4R:
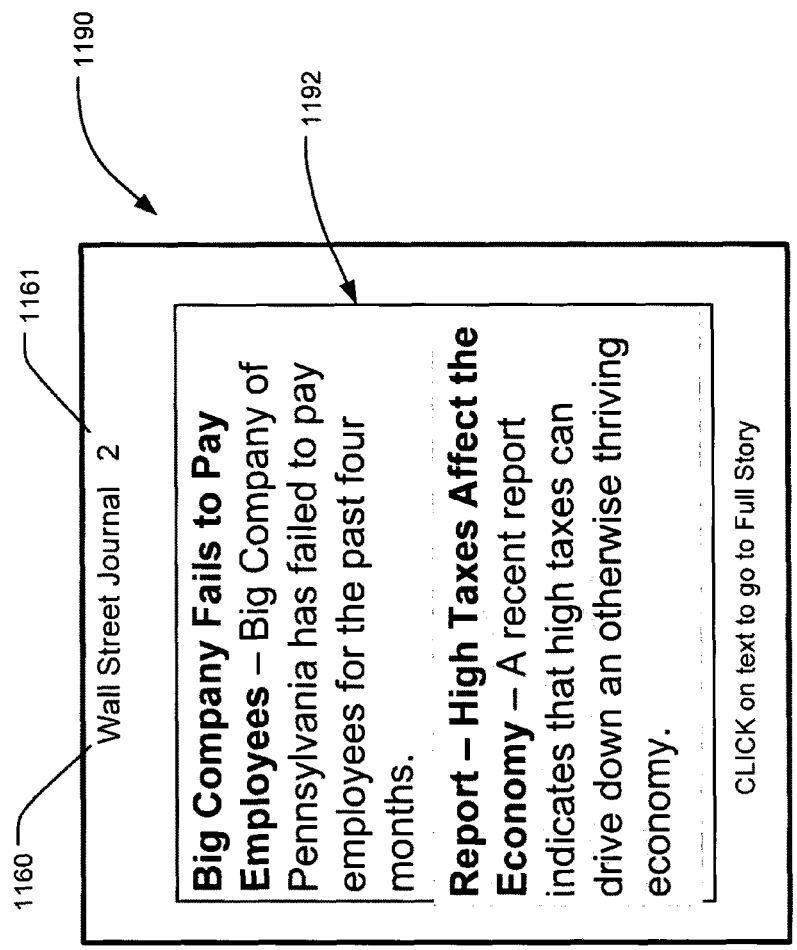

In one embodiment, the hover over window 1190 may be configured as generally depicted in FIG. 4R. The hover over window 1190 may be configured to include a news content section 1192 for setting out news information in full or summarized format. By clicking on the hover 1190, a user may retrieve or otherwise access news information for display on an associated display device 113 (not shown) from/at a predetermined URL at which such news content may be published. Content provided in the news content section 1192 may be received/retrieved from a predetermined "Really Simple Syndication"/"Rich Site Summary" feed (i.e. RSS feed).

Depending on the nature of a selected category of storefront, hover over functionality can be tailored to provide a user with a predetermined tool or application. Alternatively, the hover over functionality may be tailored to provide certain formation and/or interactivity of relevance to the subject matter to which the selected storefront may be associated. Examples of the tools/applications that may be provided via the hover over include, for example, but are not limited to, personal information manager (PIM) including, but not limited to such things as calendar, contacts and tasks entry and/or display. These tools/applications may also include e-mail client for sending and/or receiving e-mail, coupon dispenser and user blog client for posting comments to a blog.

The hover over may be configured to change character in terms of display and/or content based on, for example, the requirements of the selected category or the interactions of the subscriber/viewer and/or the advertiser/storefront owner. In one embodiment, the hover over provides an expended size or view of the storefront to accommodate distant viewing.

In one embodiment, the hover over may be configured to function as a personal information manager (PIM) by allowing a user to input and access personal information such as contact information, calendar/scheduling information, as well as check lists via fields and information displayed via the hover over window. In another embodiment, the hover over may be configured to function as a e-mail client for sending and receiving e-mail. In a further embodiment of the hover over may be configured to allow a user to input comments or feedback via input fields displayed via the hover over, about, for example, a particular product, advertisement, movie, television show, vendor or other things. Yet a further embodiment of the invention provides for a hover over that is configured to offer or dispense coupons or coupon applications to a user for print out or electronic storage on a suitable storage medium for subsequent presentation to a retailer/advertiser/or vendor. The hover over providing this type of functionality/tools/applications need not be limited to use in conjunction with a storefront but can also be used in conjunction with any type of hyperlink or introductory content.

In one embodiment the hover over is configured to allow a user/subscriber to extract the hover over from the displayed GUI so that it remains displayed on an associated display device even after the GUI/Guide has been closed or is otherwise no longer on display on the associated display device. Alternatively, the hover over may be configured to allow a user/subscriber to "minimize" the hover over and place it at a desired position/location on the GUI. This functionality allows a user to keep the hover over accessible on the display device independently of a main GUI or guide system.

Hover over activity, including user interaction with the hover over, may be monitored and data concerning the hover over may be reported/collected via associated metric collection facilities associated with the hover over. Variables such as the number of times a user activates a hover over and/or how long the hover over window is kept open may be collected and saved. Further, data concerning how many and what types of media content were selected by a user via the hover over may be collected and stored. The hover over may also be configured to report or otherwise provide such information as the usage, durations, times, etc. to a predetermined metric collection and/or data analysis system or other predetermined recipient.

Figure 5A:
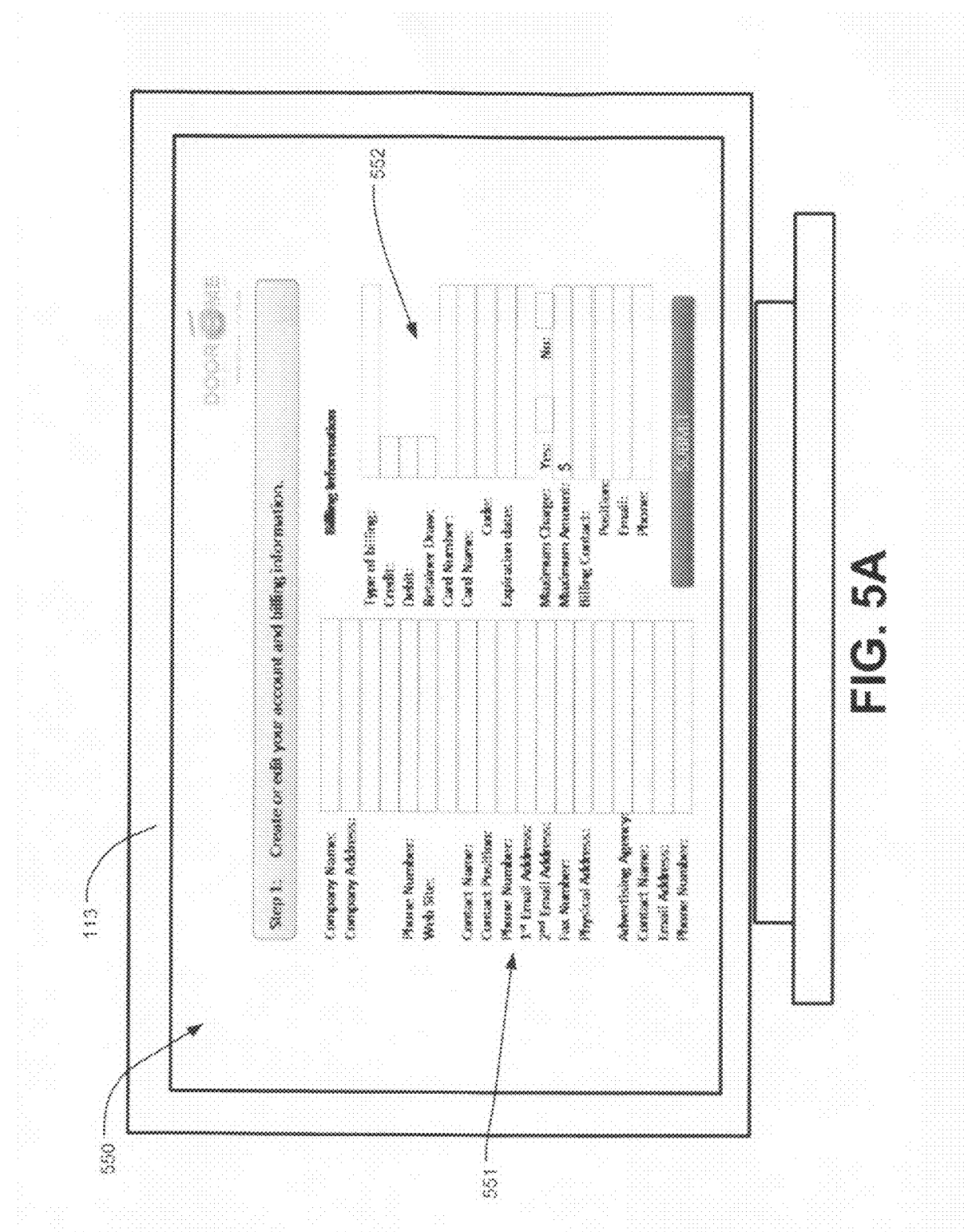
FIG. 5A-5C are diagrams generally depicting an example of a user interface for allowing an advertiser or content provider to set up and control a storefront.
Figure 5B:
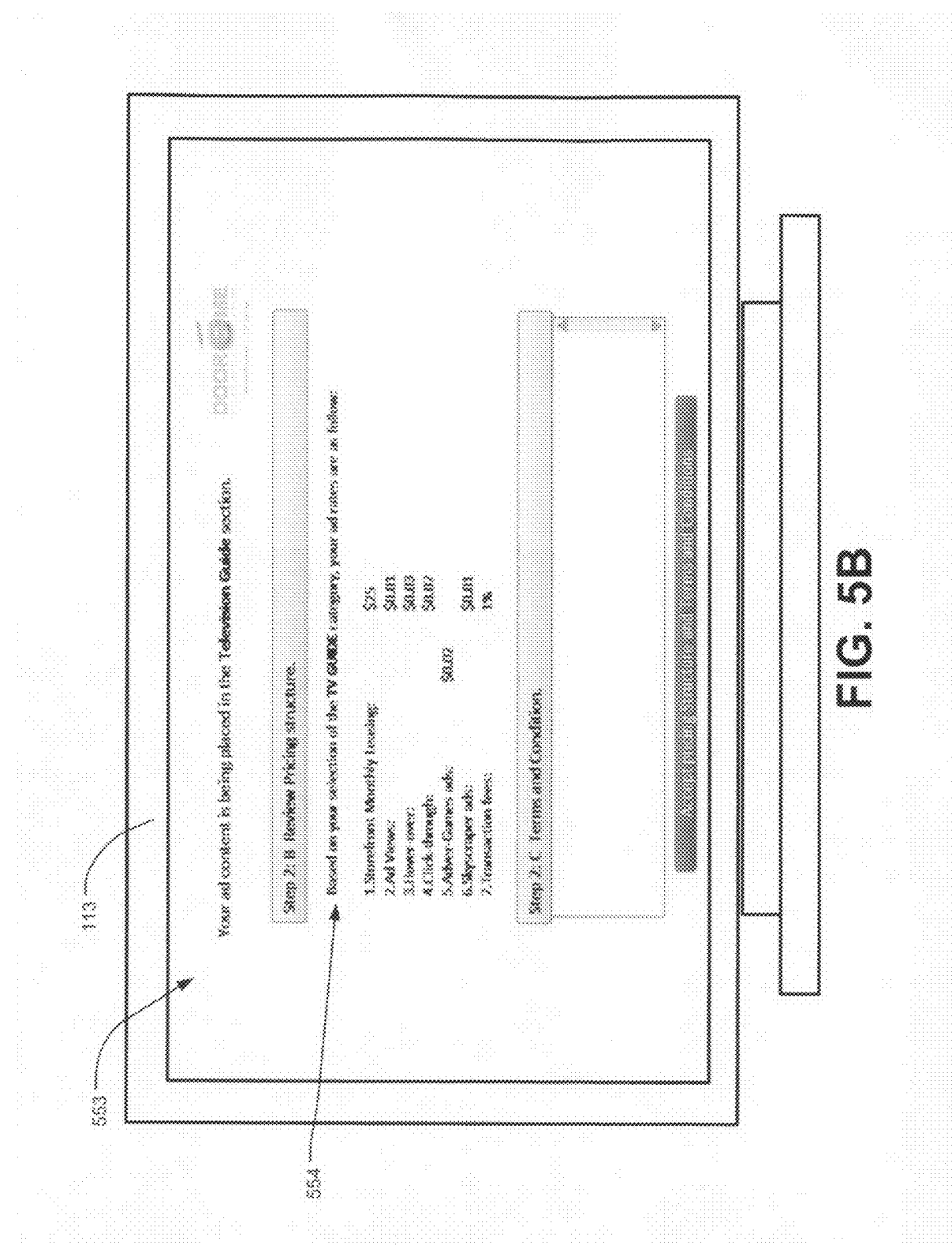
Figure 5C:
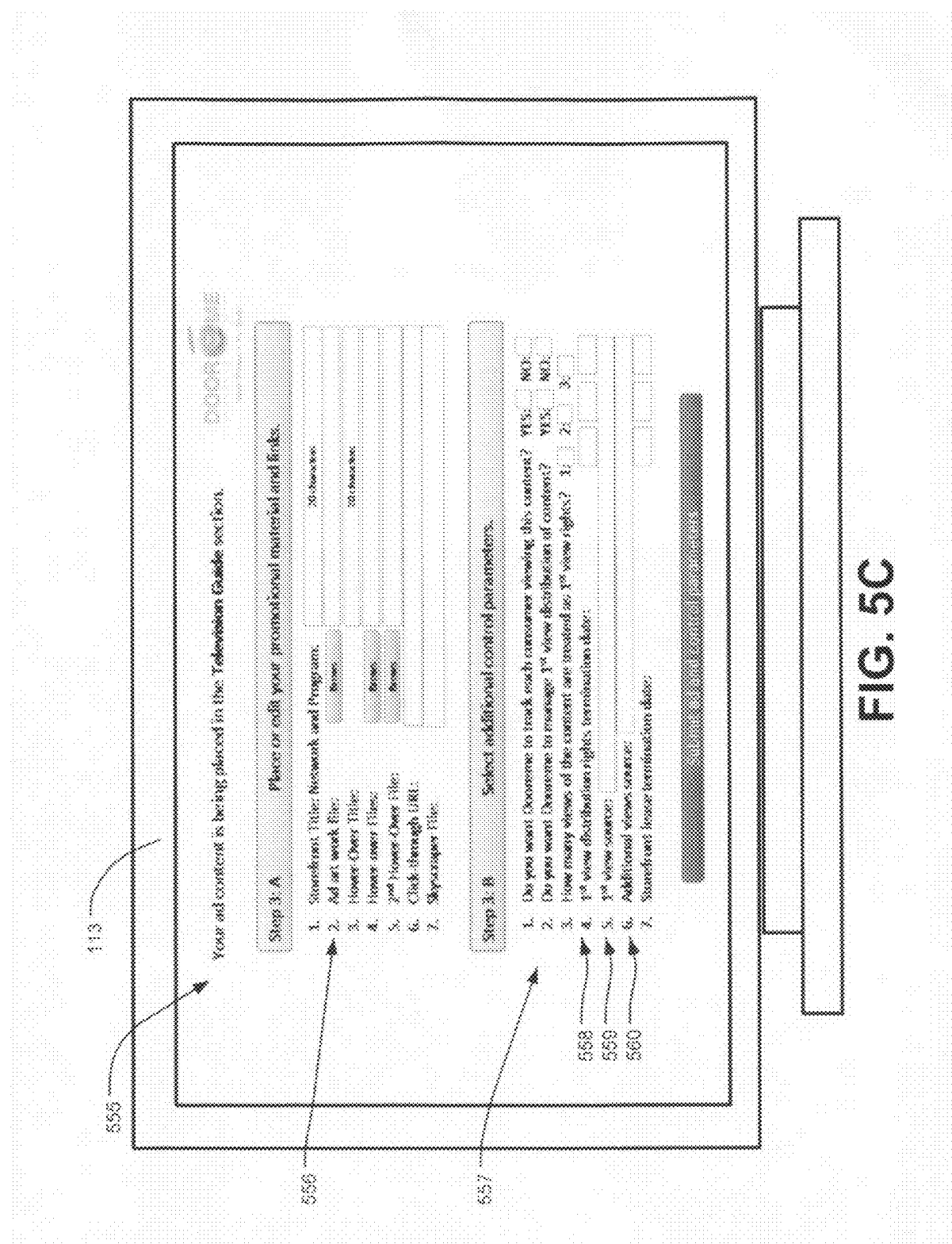

FIG. 5A-FIG. 5C are diagrams generally depicting control screens 550, 553, and 555. These control screens may be generated and displayed on a display associated with a user terminal (not shown) and used to enter information for establishing a storefront and defining the attributes and functions that the storefront will have or otherwise provide. Information entered by a storefront owner via these control screens may be received, acted upon and stored via the source control 250 (FIG. 2A). Control screen 550 provides the storefront owner the ability to enter information related to the identity of the storefront owner 551 as well as billing information 552. Control screen 553 provides the storefront owner with information concerning rates and costs associated with establishing and running a storefront 554. Control screen 555 provides the storefront owner the ability to establish links to material to be displayed in conjunction with Hover over windows that may be used in conjunction with the storefront 556. It also provides the storefront owner the ability to define other control parameters, including, but not limited to, first distribution rights termination dates 558, first view source/location identification information 559 and additional view sources location and identification information 560.

In order to reduce fees/charges (click-thru charges) incurred by, for example, an advertiser or other interested party, when a user "clicks thru" a published hyper-link to gain access to content/information (primary content), it is proposed that intermediate information (intermediate content) be provided to a user/subscriber to allow them to make a better informed decision as to whether or not the information accessible via the hyper-link is really of interest to them. By providing intermediate content/information to the use/subscriber before they choose to "click thru" a hyperlink, it is possible to reduce the number of click-thru charges that may be incurred by an advertiser/interested party when a user/subscriber accidently/carelessly/disinterestedly clicks-thru a given hyper-link. In one embodiment, click thru charges may be assessed to an advertiser/interested party when a user clicks thru to intermediate content. Preferably such charges will be less than the click thru charges associated with click thrus to the primary content.

As an illustration, a user browsing published content on, for example, the world-wide web (WWW) or other network, may come upon published information that relates to subject matter to which the user is interested, for example, advertising information related to a predetermined product (introductory content). The published introductory content may include a hyper-link to some additional information/content (primary content) presumably related to the subject matter. In one embodiment, as the user navigates a pointing device/cursor/finger to/toward/over the published hyper-link, a hover over window (hover over) will appear above and/or near the hyperlink. This hover over is preferably configured to provide the user with a view of additional information/content (intermediary content), preferably, but not necessarily, content that is separate and distinct from the introductory content or primary content, concerning the subject matter. The hover over is preferably configured to include a second hyper-link to the primary content via which a user may access the primary content.

In one embodiment a system is provided in which primary content associated with or linked to a given hyper-link is stored or otherwise provided by/on a primary content source, while intermediate content may be stored by/on a intermediate content source. Further introductory content may be stored or provided by an introductory content source. The introductory content source, primary media source and the intermediate source may be controlled by a single party or separate parties or stored on one or more media servers. Further, introductory content, intermediate content and primary content may be the same or different content.

Figure 6:
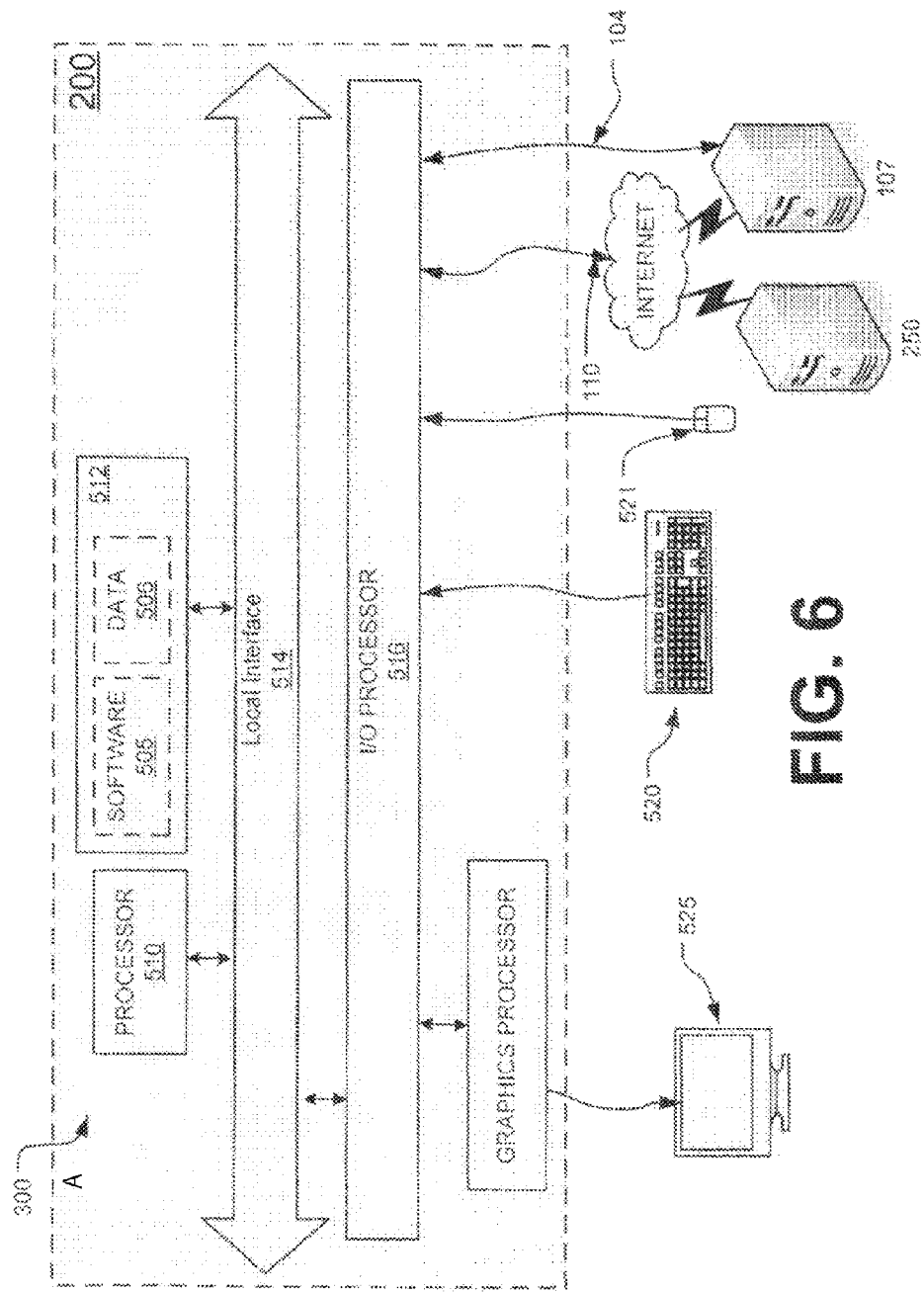
FIG. 6 is a diagram generally depicting details of an embodiment of a subscriber unit 202.

FIG. 6 is a diagram depicting a possible implementation of a subscriber unit 200. In this example, the subscriber unit 200 is configured to include a processor 510 and memory 512, for storing software 505 and data 506. A local interface 514 is provided to allow the processor 510 and other components of the subscriber unit 200 to exchange instructions and/or data. An I/O processor 516 is provided to receive input from input devices such as keyboard 520 and pointing device 521. It also provides for output of data to graphics processor for generation of an output video or graphics signal to display device 525. The subscriber unit 200 may be configured to request data from, for example, a source control unit 250 or distribution control system 107. Similarly, a source control unit 250 may be configured to receive data and/or queries from, for example, the subscriber unit 200. The subscriber unit 200 can be implemented in hardware, software, firmware, or a combination thereof. In a preferred embodiment(s), the subscriber unit 200 is implemented in software or firmware that is stored in a memory and that is executed by a suitable instruction execution system. If implemented in hardware, as in an alternative embodiment, the subscriber unit 200 can be implemented with any one or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Figure 7:
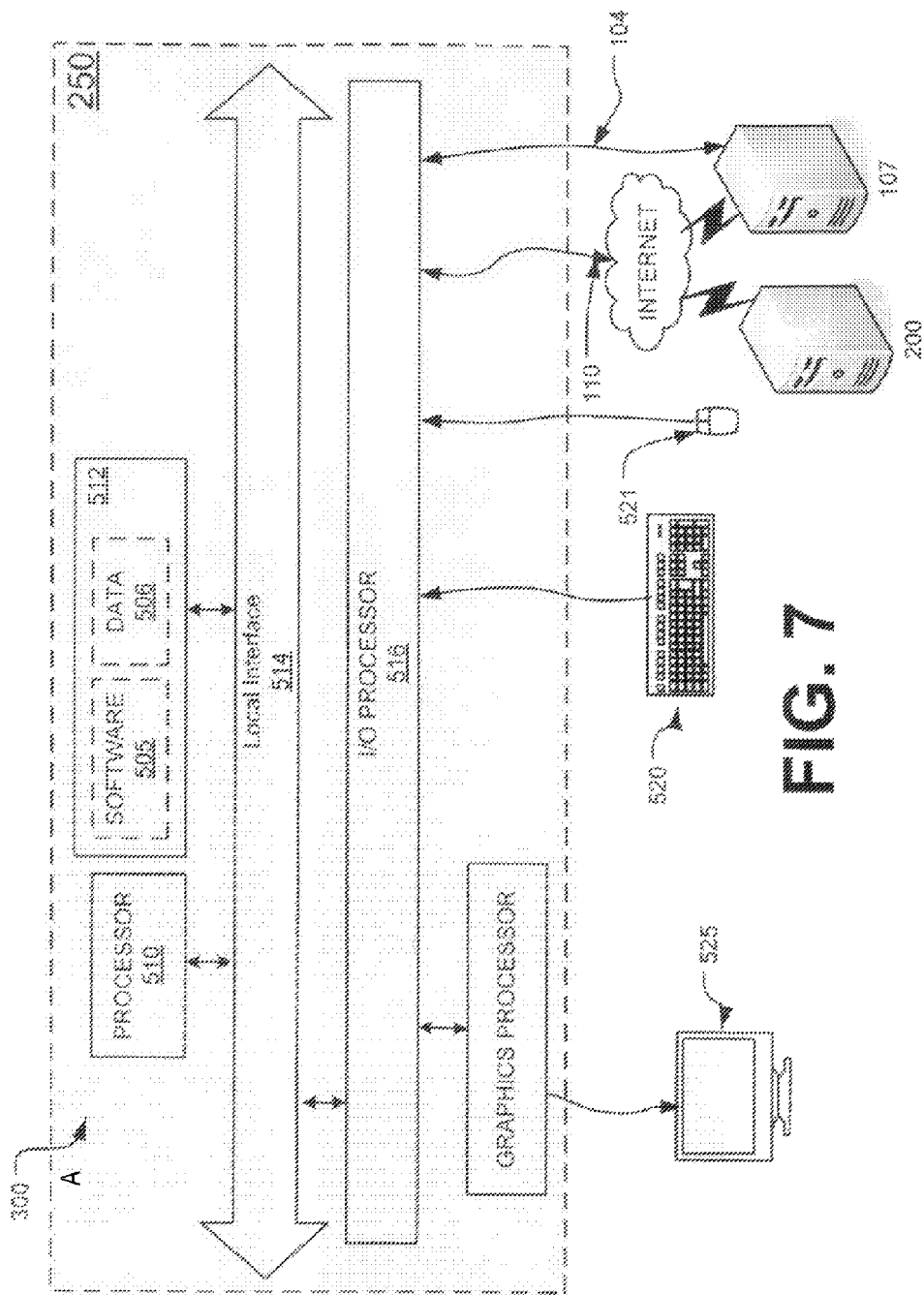
FIG. 7 is a diagram generally depicting details of an embodiment of a source control unit 250.

FIG. 7 is a diagram depicting a possible implementation of source control unit 250. In this example, the source control unit 250 is configured to include a processor 510 and memory 512, for storing software 505 and data 506. A local interface 514 is provided to allow the processor 510 and other components of the source control unit 250 to exchange instructions and/or data. An I/O processor 516 is provided to receive input from input devices such as keyboard 520 and pointing device 521. It also provides for output of data to graphics processor 718 for generation of an output video or graphics signal to display device 525. The source control unit 250 may be configured to request data from, for example, a subscriber unit 200 or distribution control system 107. Source control unit 250 may be configured to receive data and/or queries from, for example, the subscriber unit 200. The source control unit 250 can be implemented in hardware, software, firmware, or a combination thereof. In a preferred embodiment(s), the source control unit 250 is implemented in software or firmware that is stored in a memory and that is executed by a suitable instruction execution system. If implemented in hardware, as in an alternative embodiment, the source control unit 250 can be implemented with any one or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow charts of FIG. 2E, FIG. 3B, FIG. 3C and/or FIG. 3D show the architecture, functionality, and operation of possible implementations of the software 505 (FIG. 6 and FIG. 7). In this regard, each block represents a unit, segment, or portion of code, which comprises one or more executable instructions for implementing the specified logical function(s). It should also be noted that in some alternative implementations, the functions noted in the blocks may occur out of the order noted in the flowcharts. For example, two blocks shown in succession in the flowcharts may in fact be executed substantially concurrently or the blocks may sometimes be executed in the reverse order, depending upon the functionality involved. The software program stored as software 505, which comprises a listing of executable instructions (either ordered or non-ordered) for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic or non-magnetic), a read-only memory (ROM) (magnetic or non-magnetic), an erasable programmable read-only memory (EPROM or Flash memory), an optical fiber (optical), and a portable compact disc read-only memory (CDROM) (optical or magneto-optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It will be recognized by those skilled in the art, that while certain aspects of the invention have been described in terms of hardware, it is possible and fully anticipated that such aspects can be implemented in software, and vice-a-versa. All such variations or implementations are fully contemplated by the present invention and are intended to fall within the scope of the invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit, principles and scope of the invention. All such modifications and variations are fully intended to be included herein within the scope of the present invention and protected by the following claims.

What is claimed:

1. A media content distribution system comprising:
a subscriber unit comprising an input device for receiving user input indicative of a media content selection, the media content selection based at least on a selection not in a current time slot of a program guide, the subscriber unit configured to
determine if the media content selection is available for viewing from a first source,
responsive to determining the media content selection is not available for viewing from the first source, determine if the media content selection is available from a second source, and
responsive to determining the media content selection is available from the second source, evaluate access criteria for the second source and identify media content for required exposure;
an input for receiving an input media content feed of the media content selection from the second source upon determining that the media content selection is not available for viewing from the first source, the input receiving the media content for required exposure before the input media content feed from the second source; and
an output for outputting an output display feed to an associated display device.

2. The system of claim 1 wherein the first source comprises a cable TV distributor.

3. The system of claim 1 wherein the first source comprises a content producer/owner.

4. The system of claim 1 wherein the first source comprises a web based media server.

5. The system of claim 1 wherein the first source comprises a cable TV distribution system.

6. The system of claim 1 wherein the second source comprises a media server associated with a content producer/owner.

7. The system of claim 1 wherein the second source comprises a storage server.

8. The media content distribution system of claim 1, wherein the media content for required exposure is provided by the first source.

9. A media content distribution system comprising a subscriber unit, the subscriber unit comprising:
an input device for receiving a user input indicative of a media content selection;
an input for receiving an input media content feed of the media content selection; and
an output for outputting an output display feed to an associated display device, the user input comprising a storefront which is displayed on an associated display device, the storefront associated with a predetermined media content selection and with assigned distribution rights for predetermined media content;
the distribution rights specifying circumstances under which the media content selection will be distributed from a given source;
the subscriber unit configured to
receive media content from a first source that has been assigned first distribution rights upon a determination that the media content selection is available for viewing,
receive media content from a second source that has been assigned second distribution rights upon a determination that the media content selection is received during a first predetermined time period and is not available for viewing from the first source,
evaluate access criteria for the second source and identify media content for required exposure, and
responsive to determining that the media content selection is not available for viewing from the first source, receive the media content for required exposure before receiving the media content from the second source.

10. The system of claim 9 wherein the storefront is associated with predetermined copyrightable subject matter.

11. The system of claim 9 wherein the storefront is associated with a predetermined source for programming.

12. The system of claim 9 wherein said storefront is associated with a single storefront owner.

13. The system of claim 9 wherein the storefront comprises an interactive icon configured to cause a video program from a predetermined source to be displayed on an associated display device.

14. The system of claim 9 wherein the first source is a cable television distributor.

15. The system of claim 9 wherein the subscriber unit is further configured to receive media content from a third source that has been assigned third distribution rights upon determining that the media content selection is received during a second predetermined time period.

16. A method of distributing media content to a subscriber unit, the method comprising the steps of:
determining, by the subscriber unit, whether a currently available media content selection from a user has previously been distributed to the subscriber unit;
where the media content selection has not previously been distributed to the subscriber unit, accessing a media content feed of the media content selection from a first source;
evaluating, by the subscriber unit, access criteria for a second source and identifying media content for required exposure; and
where the media content selection has previously been distributed to the subscriber unit, accessing a media content feed of the media content selection from a second source, wherein the media content for required exposure precedes the media content feed from the second source.

17. A method for distributing media content to a subscriber unit, the method comprising the steps of:
- evaluating, by the subscriber unit, access criteria for a second source and identifying media content for required exposure;
- determining, by the subscriber unit, whether a media content selection from a user is available for viewing from a first source, the media content selection based at least on a selection not in a current time slot of a program guide;
- where the media content selection is available for viewing from the first source, accessing a media content feed of the media content selection from the first source; and
- where the media content selection is not available for viewing from the first source, accessing a media content feed of the media content selection from the second source, wherein the media content for required exposure precedes the media content feed from the second source.

18. A method of distributing media content to a subscriber unit, the method comprising:
- receiving a user input indicative of a media content selection;
- receiving, by the subscriber unit, media content from a first source that has been assigned first distribution rights upon a determination that the media content selection has not previously been received by the subscriber unit;
- receiving, by the subscriber unit, media content from a second source that has been assigned second distribution rights upon a determination that the media content selection is received during a predetermined first time period;
- evaluating, by the subscriber unit, access criteria for the second source and identifying media content for required exposure; and
- responsive to the determination that the media content selection is received during a predetermined first time period, receiving, by the subscriber unit, the media content for required exposure before the media content from the second source.

19. The media content distribution system of claim 9, wherein the media content for required exposure is provided by the first source.

* * * * *